United States Patent [19]
Kulish et al.

[11] Patent Number: 5,827,358
[45] Date of Patent: Oct. 27, 1998

[54] RAPID CYCLE PRESSURE SWING ADSORPTION OXYGEN CONCENTRATION METHOD AND APPARATUS

[75] Inventors: Stanley Kulish, Toledo; Robert P. Swank, Mansfield, both of Ohio

[73] Assignee: Impact MST, Incorporation, Cincinnati, Ohio

[21] Appl. No.: 745,281

[22] Filed: Nov. 8, 1996

[51] Int. Cl.⁶ .................................................. B01D 53/047
[52] U.S. Cl. ............................... 96/115; 96/124; 96/130; 96/133; 96/144; 96/149
[58] Field of Search ......................... 95/95–98, 100–105, 95/130; 96/115, 121, 124, 130, 133, 137, 143, 144, 149

[56] References Cited

U.S. PATENT DOCUMENTS

| | | | |
|---|---|---|---|
| Re. 35,099 | 11/1995 | Hill | 96/124 X |
| 3,280,536 | 10/1966 | Berlin | 95/130 X |
| 3,564,816 | 2/1971 | Batta | 95/130 X |
| 3,636,679 | 1/1972 | Batta | 95/130 X |
| 4,129,424 | 12/1978 | Armond | 96/130 X |
| 4,194,891 | 3/1980 | Earls et al. | 96/115 X |
| 4,194,892 | 3/1980 | Jones et al. | 95/95 |
| 4,234,322 | 11/1980 | De Meyer et al. | 95/19 |
| 4,272,265 | 6/1981 | Snyder | 96/115 |
| 4,340,398 | 7/1982 | Doshi et al. | 96/130 X |
| 4,378,982 | 4/1983 | McCombs | 96/130 X |
| 4,381,189 | 4/1983 | Fuderer | 96/130 X |
| 4,406,675 | 9/1983 | Dangieri et al. | 95/26 |
| 4,650,501 | 3/1987 | Hiscock et al. | 95/100 |
| 4,684,377 | 8/1987 | Haruna et al. | 95/130 X |
| 4,756,723 | 7/1988 | Sircar | 95/130 X |
| 4,781,735 | 11/1988 | Tagawa et al. | 95/130 X |
| 4,787,417 | 11/1988 | Windsor, Jr. | 96/124 X |
| 4,877,429 | 10/1989 | Hunter | 96/115 X |
| 4,927,434 | 5/1990 | Cordes et al. | 95/15 |
| 5,002,591 | 3/1991 | Stanford | 96/115 X |
| 5,015,272 | 5/1991 | Okada et al. | 95/26 |
| 5,082,474 | 1/1992 | Shirley et al. | 95/26 |
| 5,084,075 | 1/1992 | Sircar | 95/130 X |
| 5,112,367 | 5/1992 | Hill | 95/98 |
| 5,114,441 | 5/1992 | Kanner et al. | 95/98 |
| 5,122,164 | 6/1992 | Hirooka et al. | 95/26 |
| 5,183,483 | 2/1993 | Servido et al. | 95/98 |
| 5,203,888 | 4/1993 | Maurer | 95/130 X |
| 5,248,325 | 9/1993 | Kagimoto et al. | 96/124 |
| 5,250,088 | 10/1993 | Yamaguchi et al. | 95/98 |
| 5,268,021 | 12/1993 | Hill et al. | 95/98 |
| 5,366,541 | 11/1994 | Hill et al. | 96/124 |
| 5,415,683 | 5/1995 | Leavitt | 95/130 X |
| 5,441,559 | 8/1995 | Petit et al. | 96/130 X |
| 5,474,595 | 12/1995 | McCombs | 96/130 X |
| 5,487,775 | 1/1996 | LaCava et al. | 95/130 X |
| 5,549,736 | 8/1996 | Coffield et al. | 96/137 X |
| 5,593,478 | 1/1997 | Hill et al. | 96/115 X |

FOREIGN PATENT DOCUMENTS 2033777  5/1980  United Kingdom ..................... 96/124

*Primary Examiner*—Robert Spitzer
*Attorney, Agent, or Firm*—Wood, Herron & Evans, L.L.P.

[57] ABSTRACT

A rapid pressure swing adsorption oxygen concentrator is provided having a plurality of at least three sieve beds cycled in sequence such that each is pressurized during one segment of a cycle and depressurized during a plurality of segments of a cycle while the other sieve beds are being sequentially pressurized. Preferably, approximately six sieves are provided and pressurized in sequence, with each being pressurized for approximately 60° of the cycle and depressurized for from about 270° to 300° of the cycle. Each sieve is thereby pressurized for about one to two seconds and depressurized for about five to ten seconds. By utilizing the ability of the sieve material to adsorb faster than it can desorb gas, high output of up to 96% pure oxygen results with a low sieve volume and low power consumption.

19 Claims, 25 Drawing Sheets

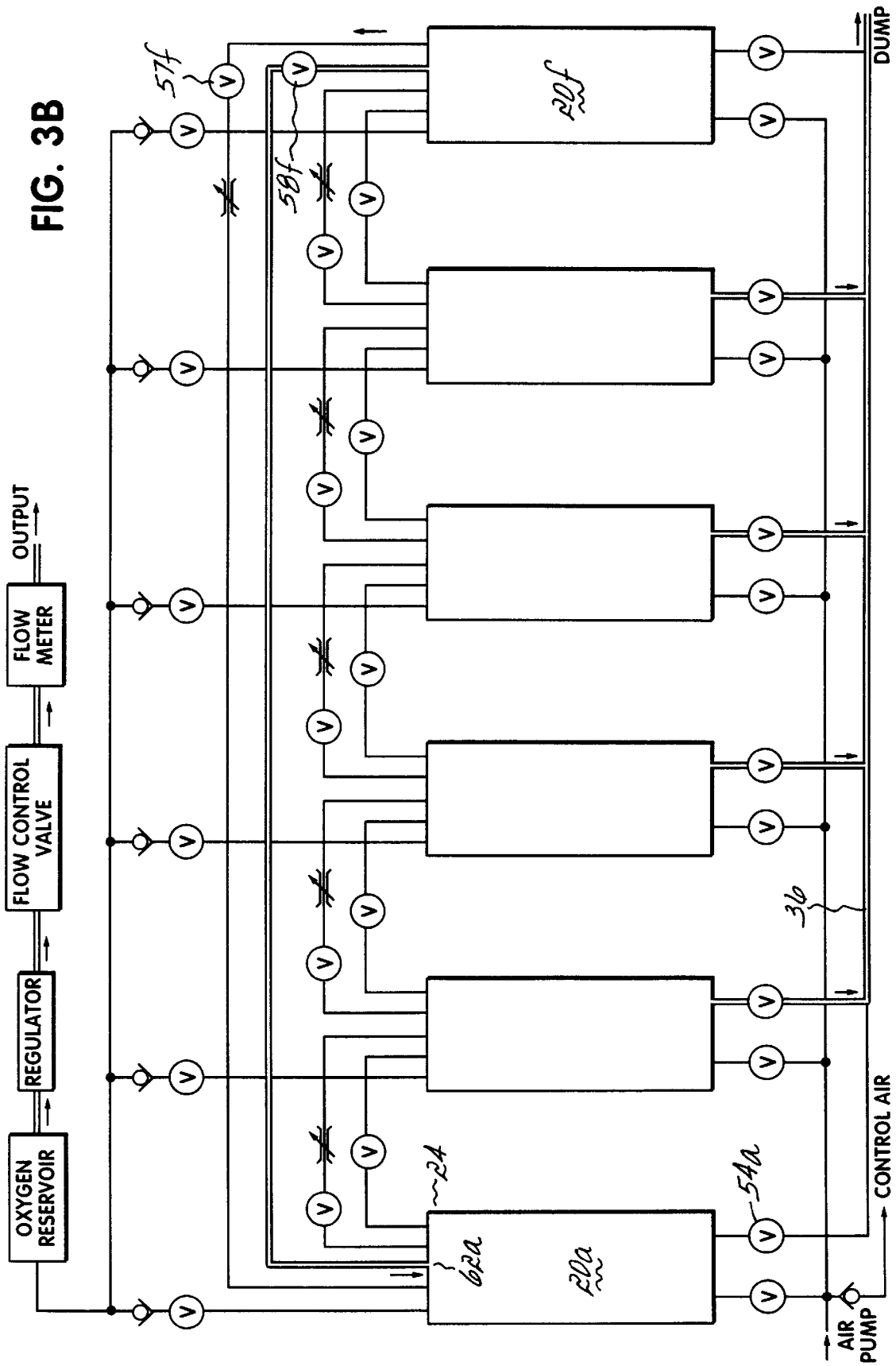

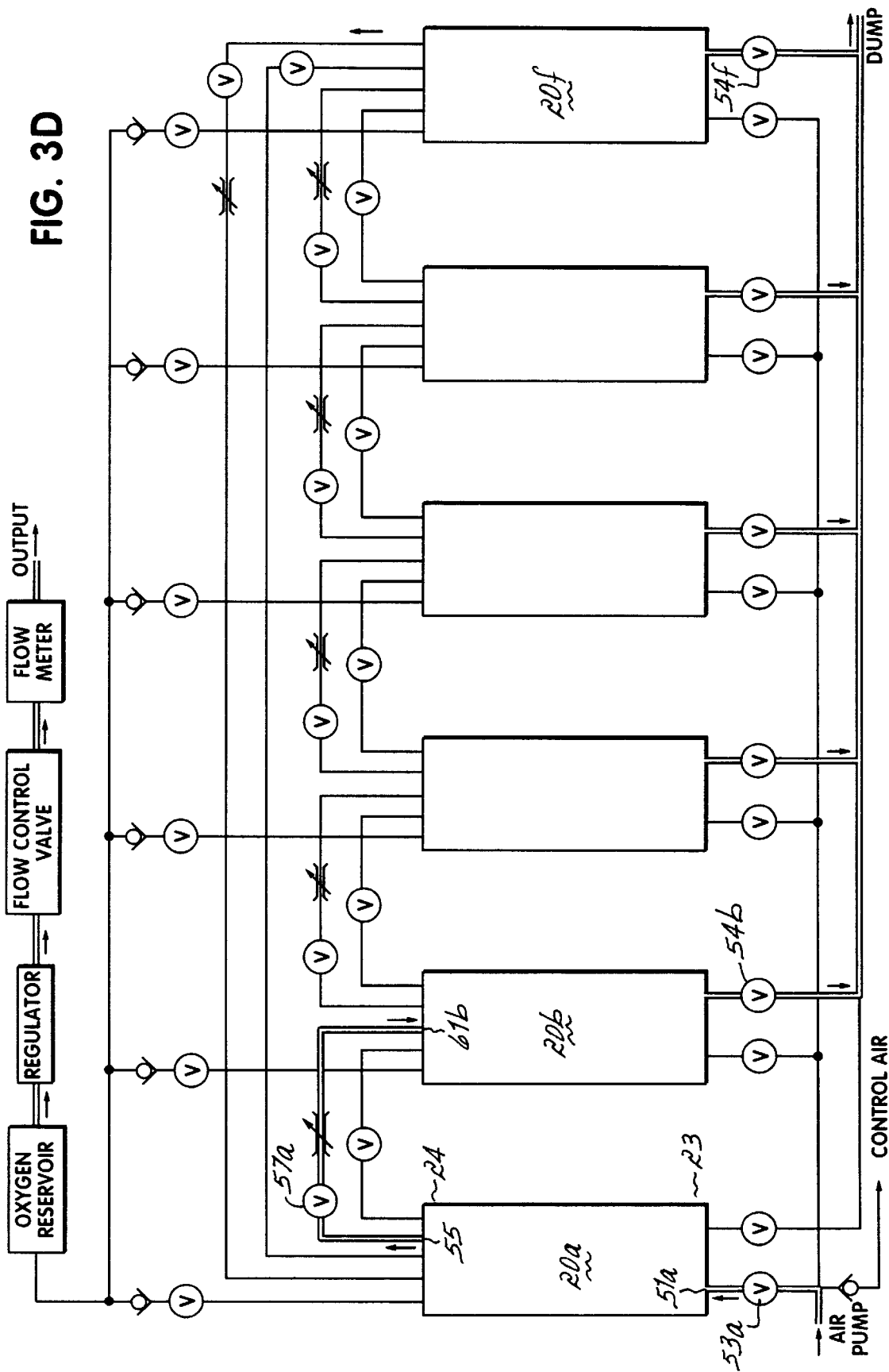

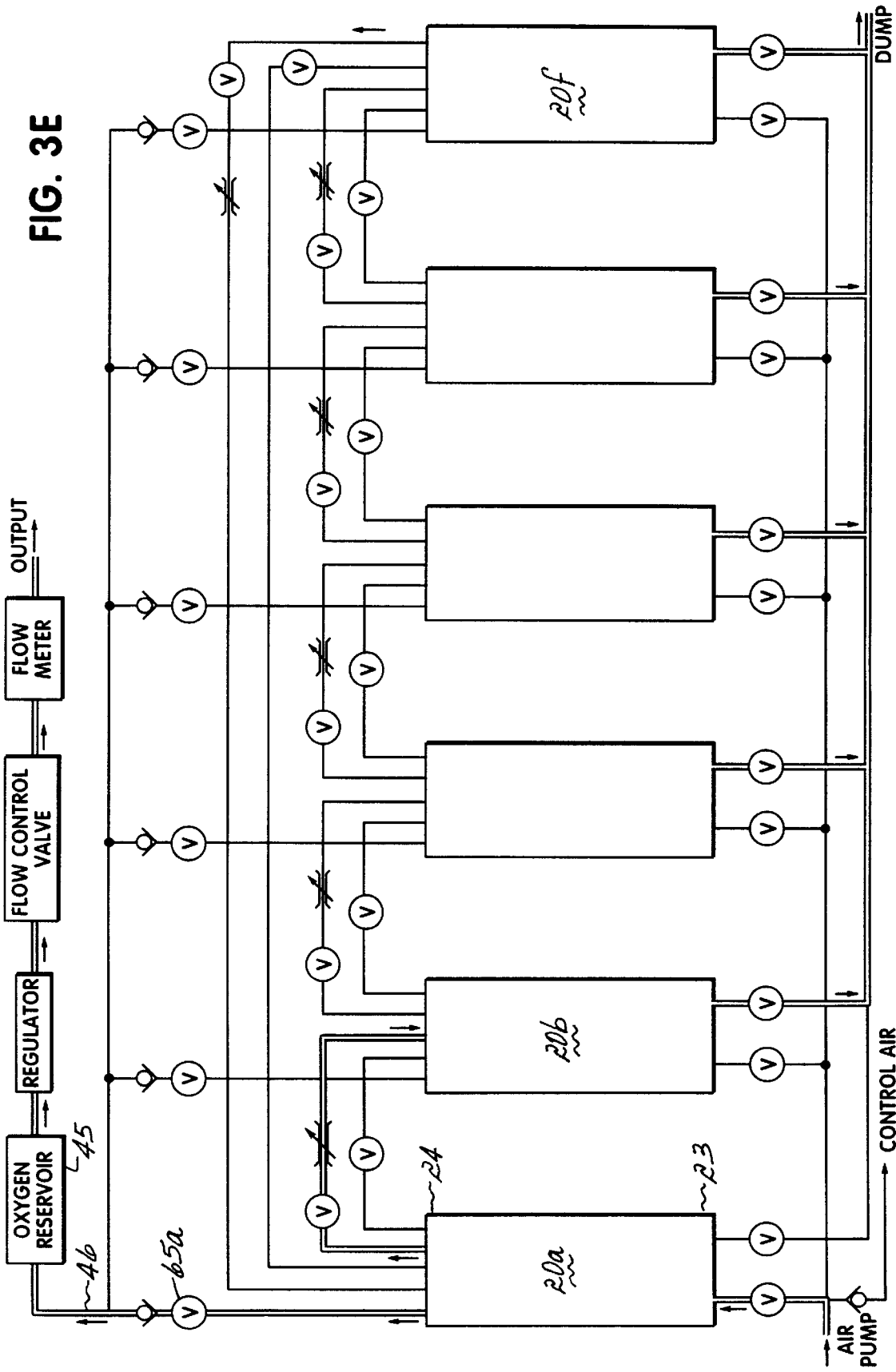

RAPID CYCLE PRESSURE SWING ADSORPTION OXYGEN CONCENTRATION METHOD AND APPARATUS

This invention relates to the separation of oxygen of high purity from air, and particularly to a space and energy saving method and apparatus for producing concentrated oxygen gas from air by rapid cycle pressure swing adsorption.

BACKGROUND OF THE INVENTION

Oxygen concentrators have, since their popularity began in the 1970s, been considered a most cost effective and preferred delivery system for the supply of supplemental oxygen therapy in homes and extended care facilities to many types of patients, such as patients with chronic obstructive pulmonary disease. These concentrators can, in a one step real-time process, provide oxygen at levels of 90 to 96 percent concentration, which has been found to be substantially the clinical equivalent to USP oxygen at 99.5% purity that is available for such uses from high pressure cylinders or liquid oxygen systems. Most commercially available oxygen concentrators separate and concentrate the oxygen from ambient air to the 90 to 96% concentration level by the technique of pressure swing adsorption or PSA.

Pressure swing adsorption is a process for separating gasses from gas mixtures, and is now a process well known for its ability of producing concentrated oxygen from air. In pressure swing adsorption processes, the gas mixture, such as air, is pumped into a sieve bed that is formed of a gas tight container filled with a granulated or particulate molecular sieve material, such as zeolite, of a special grade commercially available for such process. For the separation of oxygen from air, 5A-zeolite(zeolite of five angstrom unit pore size) is one such molecular sieve material that is commonly used. In the separation process, the sieve material selectively attracts and adsorbs gasses from the mixture. In a process for separating oxygen from air, gasses such as carbon dioxide and water vapor are first adsorbed by the particles within the sieve material, More importantly, the next gas adsorbed by the sieve bed material is nitrogen, which is adsorbed by the sieve material from the air in preference to oxygen. As a result, a properly sized, pressurized and cycled sieve bed will remove essentially all of the gasses from the air leaving a mixture of only oxygen and argon. The argon will not be adsorbed by the sieve material before the adsorption of oxygen. The resulting product gas has a purity of in excess of 90% oxygen, and in many systems can have a concentration of approximately 96% oxygen and 4% argon. Molecular sieve beds are, for simplicity, referred to below as sieves.

The typical oxygen concentrator that uses PSA to produce oxygen for oxygen therapy uses two sieves of at least 1500 $cm^3$ to produce concentrated oxygen at a rate of at least 2 liters per minute (LPM). Operated through a cycle in which the sieves are alternatively pressurized for 30 seconds to 30 psig (30 pounds per square inch above atmospheric pressure), and then depressurized for 30 seconds to atmospheric pressure, the sieves each produce one liter of product gas per cycle, or two LPM. The oxygen concentrator systems of the prior art have, however, been larger and heavier than is desirable, have consumed more energy in the operation of the pump than is desirable, and have generated noise and vibration. When the flow rates are increased or the pressures varied in an effort to reduce the size of the concentrator, it has been found that the concentration of oxygen in the product gas quickly declines as nitrogen breaks through the bed and enters the effluent product gas stream.

Accordingly, there remains a need for a superior oxygen concentrator that is light in weight and compact in size, that is quiet, that utilizes energy efficiently and that produces oxygen at 2 to 5 LPM in concentrations of at least 90% and preferably 96%.

SUMMARY OF THE INVENTION

A primary objective of the present invention is to provide a PSA oxygen concentrator for use in oxygen therapy that improves upon those of the prior art in one or more respects. It is a particular objective of the present invention to provide an oxygen concentrator and method of concentrating oxygen that is lighter in weight and more compact in size than the concentrators of the prior art, that is quiet in operation, that utilizes less energy and operates more efficiently than the concentrators of the prior art and that produces oxygen at 2 to 5 LPM in concentrations of at least 90% and preferably up to at least 96%.

According to principles of the present invention, there is provided a pressure swing adsorption oxygen concentrator having at least three sieve beds, operated sequentially, with each operated in an asymmetric cycle to optimize the function of the sieves by allowing greater time for the sieves to desorb nitrogen and other adsorbed gases and less to adsorb such gasses, taking advantage of the ability of the sieve material to adsorb gases at a much faster rate than they can be desorbed, thereby increasing product gas output with relatively small sieves.

In accordance with the preferred embodiment of the invention, there is provided a pressure swing adsorption oxygen concentrator that utilizes more than two sieves and that operates according to a method that depressurizes each sieve for a greater portion of the PSA cycle than the sieve is subjected to pressure. In the preferred embodiment of the invention, the cycles of each of the sieves of the plurality of sieves are shifted in phase relative to each other by an amount that will equally space the cycles around the cycle, or preferably by 360° divided by the number of sieves. Preferably further, an asymmetrical pressurize-depressurize cycle is employed such that one sieve at a time is subjected to pressurization while more than one of the other sieves of the plurality are being depressurized, so that each sieve is depressurized for more than twice as long as it is subjected to pressure. A plurality of sieves in the range of from three to ten sieves is preferred, with four to six sieves being presently regarded as most preferable. Preferably, for a plurality of N sieves, with each sieve being depressurized N−1 times as long as the sieve is pressurized. In terms of a 360° pressurization-depressurization cycle, a bed will preferably be pressurized for not more than 1/N of the cycle and depressurized for about (N−1)/N of a cycle. With six beds, for example, a bed might be pressurized for not more than ⅙th of the time it is depressurized, or pressurized for not more than 60° and depressurized for about 300° of the cycle.

Further in accordance with the preferred embodiment of the present invention, sieves having a small volume of from 50 to 150 $cm^3$ are provided in a circular array. Where the number of sieves is six, the sieves are each cycled five to ten times per minute, or for a six to twelve second cycle, with the sieves each being pressurized for about one sixth of a cycle and depressurized for about five-sixths of a cycle, with the cycles of the sieves being phased in sequence at 60° intervals relative to each other. In the illustrated embodiment, six 50 $cm^3$ sieves are each cycled so as to be pressurized for about one second and depressurized for about five seconds each cycle to produce concentrated oxygen at a rate of about 2 LPM. Preferably, the portion of the cycle during which the sieve is vented to atmosphere is four to five times longer than the remaining portion of the cycle.

In the preferred and illustrated embodiment of the invention, each of the sieves is brought to the end of a cycle by being vented to atmosphere at the end of its depressurization sub-cycle. At the end of the depressurization sub-cycle as the sieve approaches the low pressure point in its cycle, a small amount of oxygen rich product gas is allowed to flow backward through the sieve, either from a product outlet reservoir or, preferably, from an adjacent sieve that is in the pressurization portion of its cycle, to purge the sieve of removed component gasses. Then the pressurization portion of the sieve cycle is begun by connecting the sieve to the previously pressurized sieve from which product oxygen has just been output, to salvage both product oxygen and pressure (and thereby pressurization energy that has already been expended by the pump) in a pressure equalization portion of the cycle. This oxygen rich gas can either be introduced into the sieve at the inlet or the outlet sides thereof from the outlet side of the previously pressurized sieve. Then, the pressurization portion of the cycle is continued by injecting inlet air into the sieve by the pump until the sieve has reached the high pressure point in its cycle. Then, an amount of oxygen product is output from the sieve to a product reservoir. During this output portion of the cycle, the sieve is still under sufficient pressure so that, for the duration of the short output portion of the cycle, removed nitrogen and other gasses do not desorb from the sieve material and enter the product gas stream. Following the outlet portion of the cycle and before the sieve is vented or dumped to atmosphere, the sieve is connected to the next sieve to be pressurized and a pressure equalization portion of the cycle is started for the next sieve with oxygen rich gas being first injected into the next sieve before air is inlet from the pump. When the pressures of the two sieves have somewhat equalized, the previously pressurized sieve is vented to atmosphere. For a six sieve concentrator, the sieve is dumped or vented to atmosphere for 270° to 290° of its cycle, with the pressure in the sieve declining for about 300° of the cycle and increasing for about 60° of the cycle.

The present invention provides the advantages of a method and apparatus for producing therapy grade, contaminant free oxygen, 90% to 96% pure, at a 2 to 5 LPM rate, in a quiet energy efficient manner, with a light weight, low volume apparatus.

These and other objectives and advantages of the present invention will be more readily apparent from the following detailed description of the drawings of the preferred embodiment of the invention, in which:

BRIEF DESCRIPTION OF THE DRAWINGS

FIGS. 3A–3G are sequential flow diagrams, similar to FIG. 3, illustrating the gas flow at various points in the operating cycle of a sieve bed and valves associated therewith of the oxygen concentrator of FIG. 2.

DETAILED DESCRIPTION OF THE DRAWINGS

Figure 1:
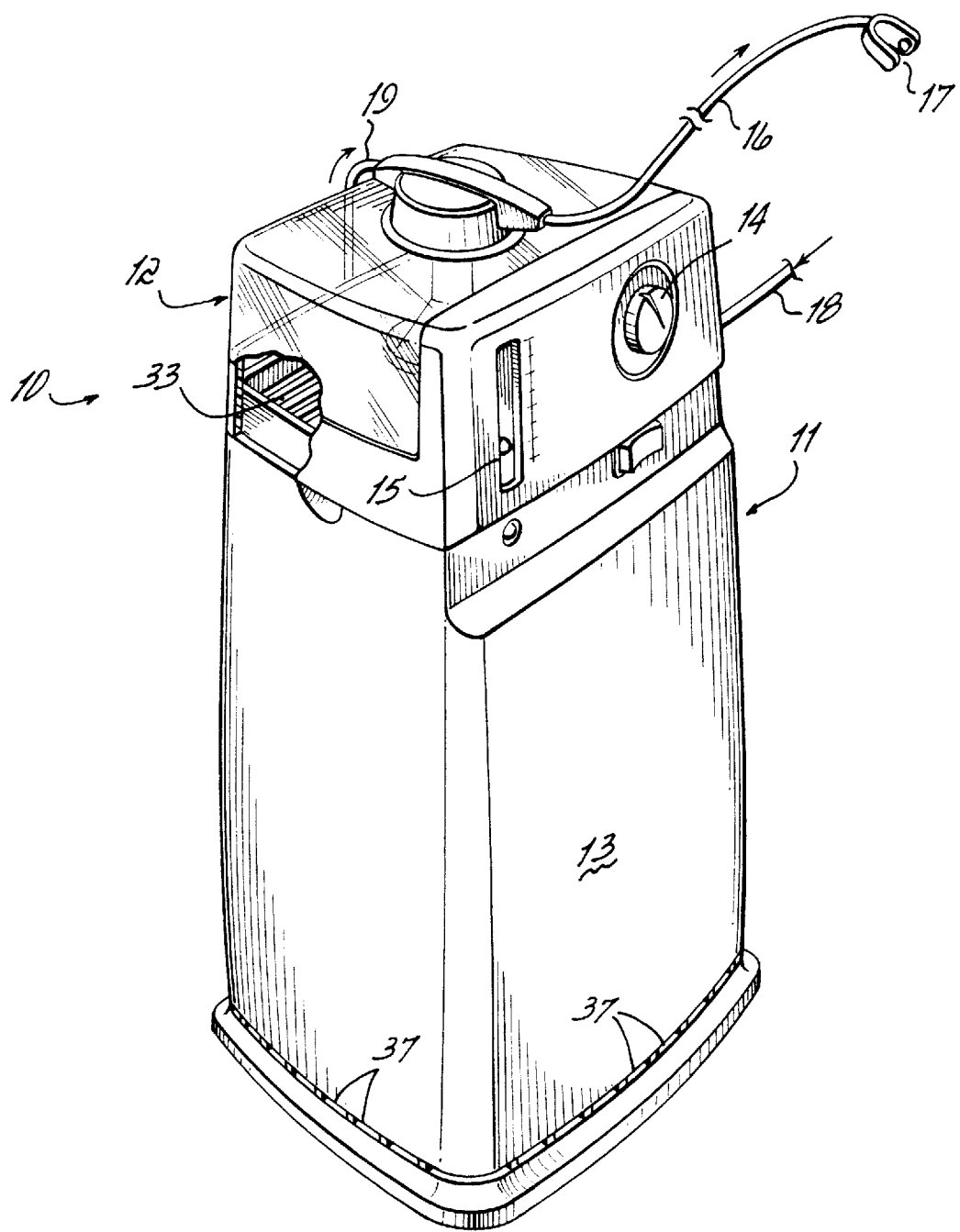
FIG. 1 is a perspective view of an oxygen supply apparatus that includes an oxygen concentrator according to one preferred embodiment of the present invention.

An oxygen supply apparatus 10 embodying principles of the present invention is illustrated in FIG. 1 as a compact single user module that includes an oxygen concentrator 11 and a humidifier 12. The concentrator 11 is contained in a floor standing or table mounted housing 13. The humidifier 12 is mounted on top of the housing 13, and is connected in series with and downstream of the concentrator 11 to restore moisture to the output of the concentrator 11 to replace the moisture that is inherently removed from the incoming air in the course of concentrating the oxygen. The humidifier 12 includes an output product flow control knob 14 and flow rate indicator 15 for use in setting and monitoring the output of the supply apparatus 10, which is emitted from the apparatus 10 at a system outlet 16 that connects to a cannula, face mask or other device 17 for delivery of humidified concentrated oxygen to a patient. The humidifier 12 has an intake that is connected to the product outlet duct 19 of the concentrator 11 so that the oxygen rich product gas from the concentrator outlet 19 is humidified to an acceptable level before being delivered to the patient. The humidifier 12 may have either an internal refillable or external water supply 18 connected thereto.

Figure 2:
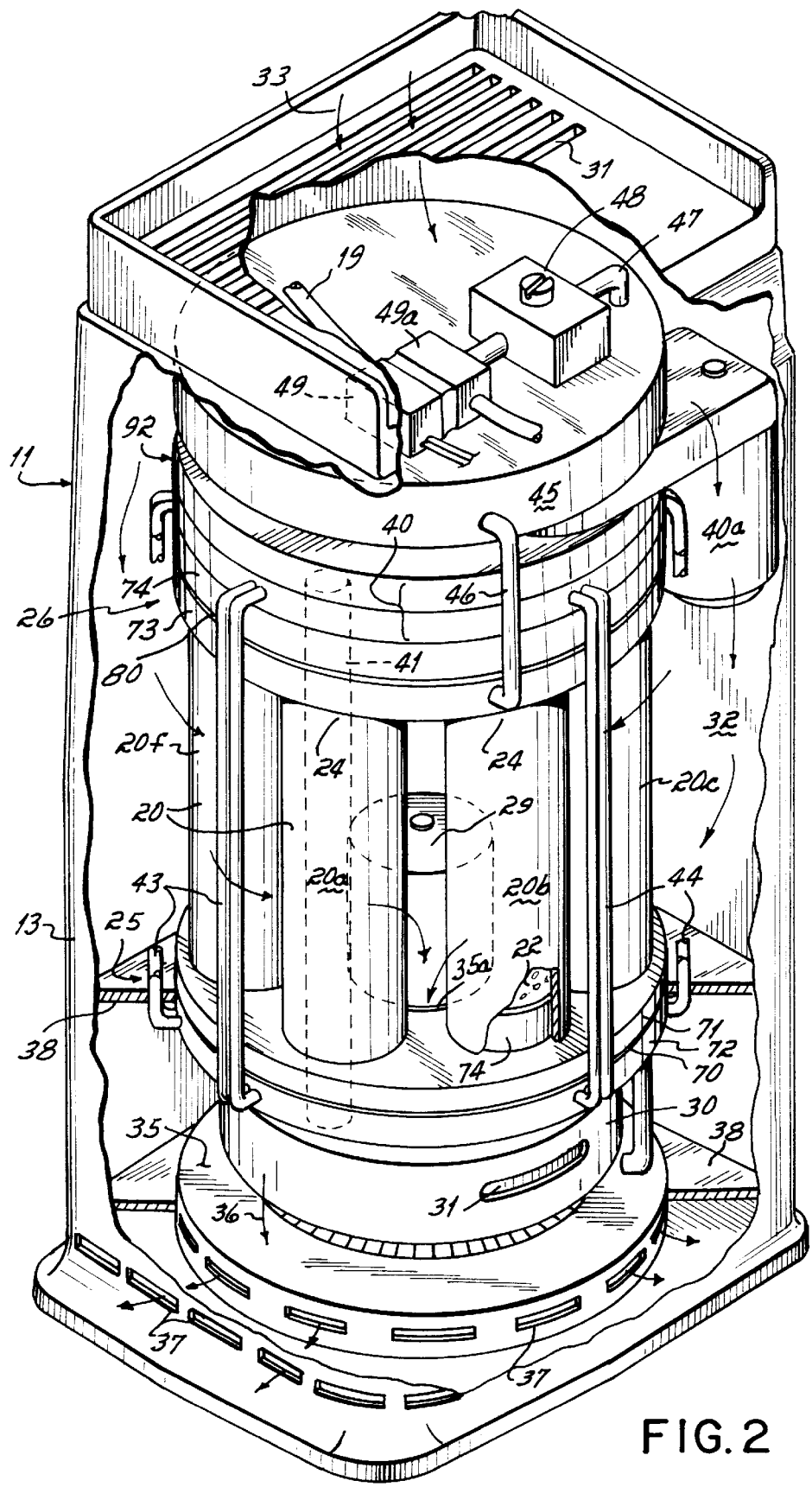
FIG. 2 is an perspective view of a rapid cycle pressure swing adsorption oxygen concentrator, according to principles of the present invention, of the oxygen supply apparatus of FIG. 1.
Figure 4:
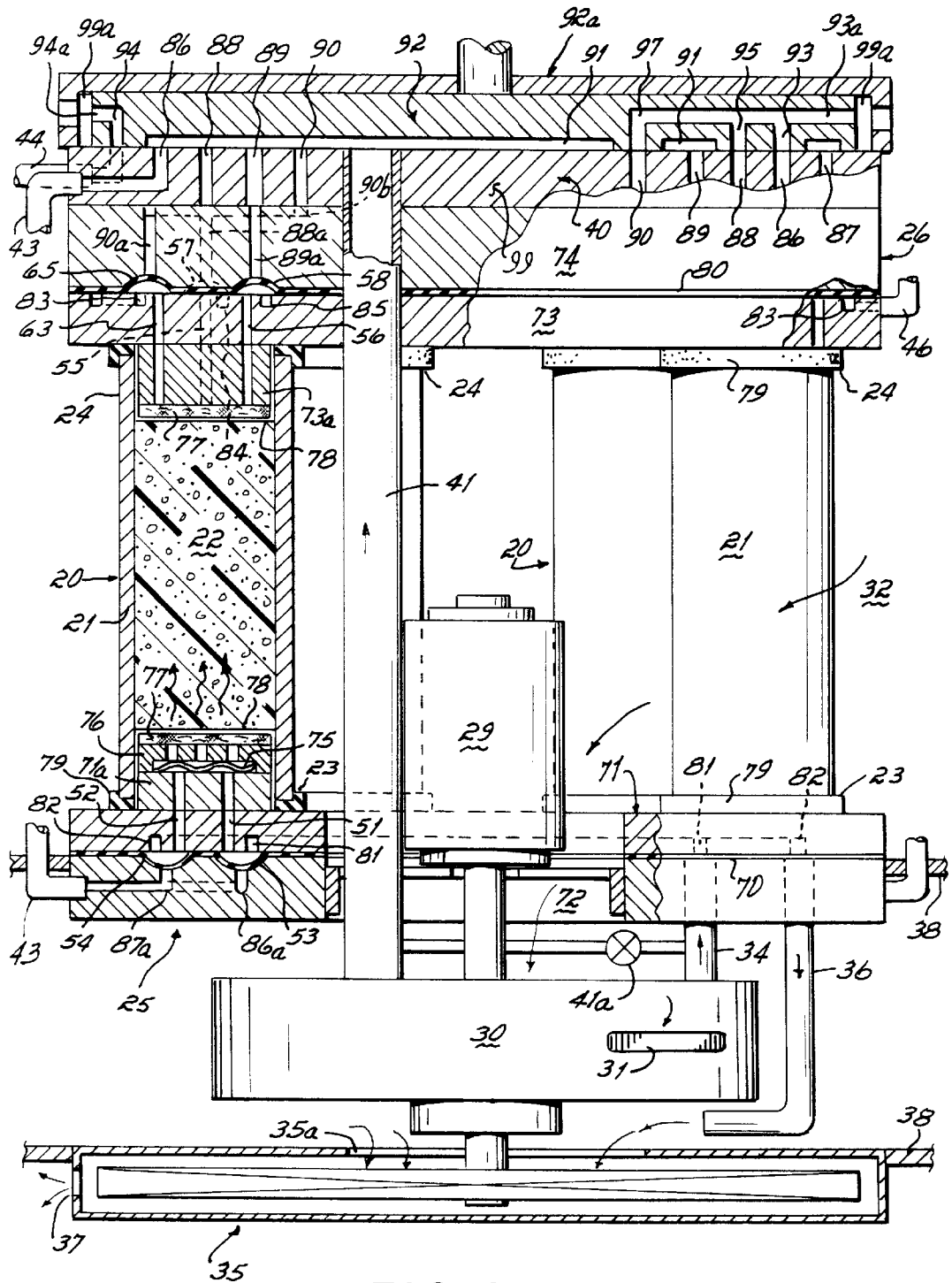
FIG. 4 is a side view, partially in cross-section, of the sieve bed and valve assembly of one embodiment of the oxygen concentrator of FIGS. 1–3G.
Figure 5:
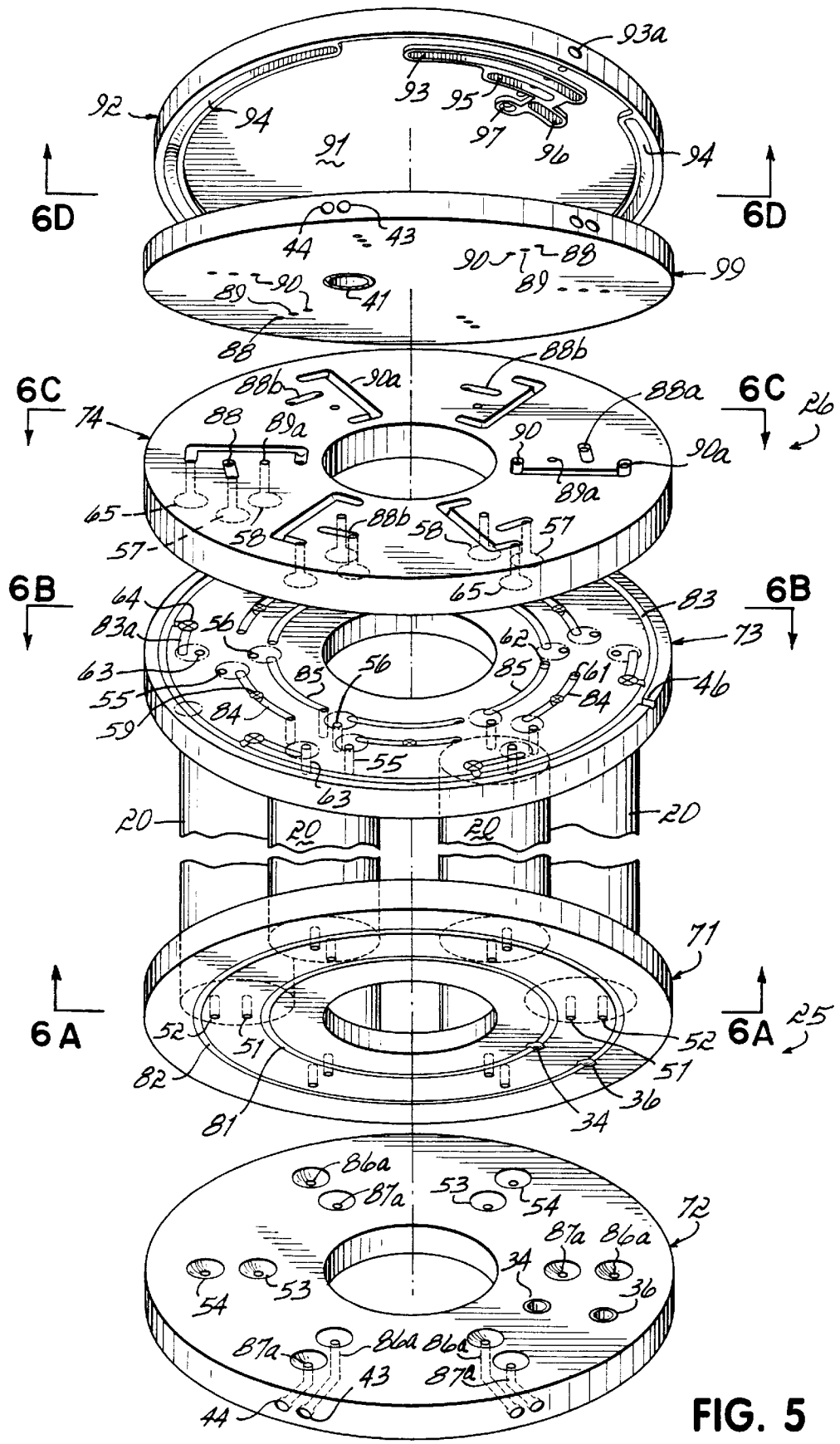
FIG. 5 is a disassembled schematic diagram of the embodiment of FIG. 4 illustrating particularly the valve and port configuration.
Figure 6A:
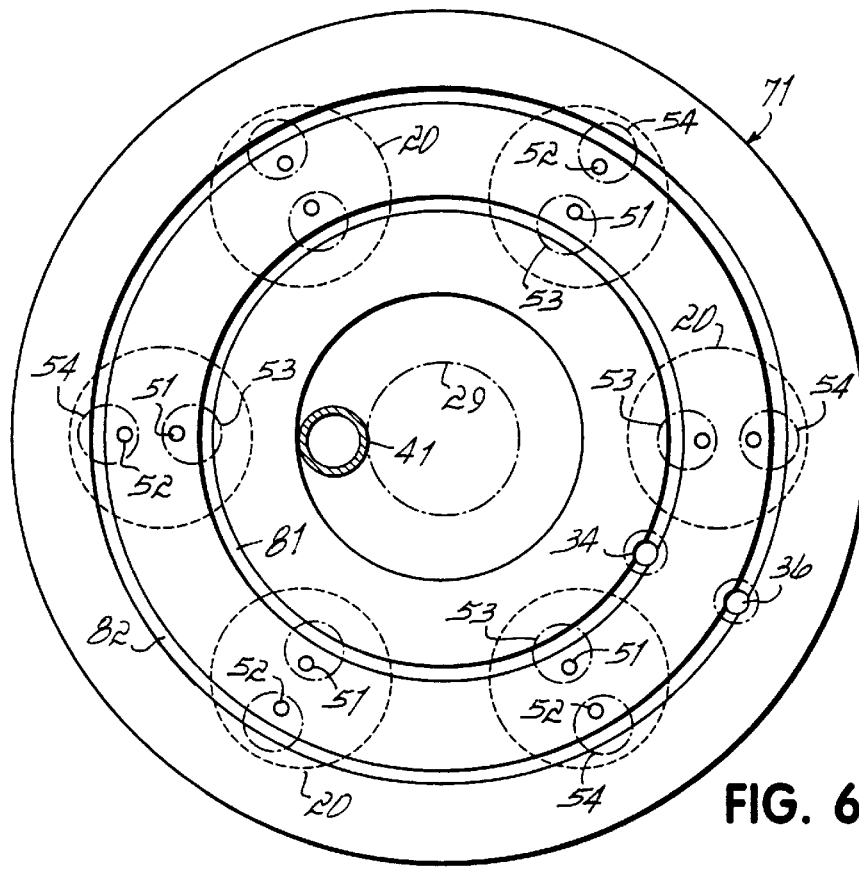
FIGS. 6A–6D are diagrammatic plan views of the embodiment of the inlet side and outlet side valve manifolds, the control line manifold and control valve aperture plate, respectively, of FIGS. 4 and 5, taken respectively along lines 5A—5A through 5D—5D of FIG. 5, with FIGS. 6B and 6C being top views and FIGS. 6A and 6D being bottom views.
Figure 6B:
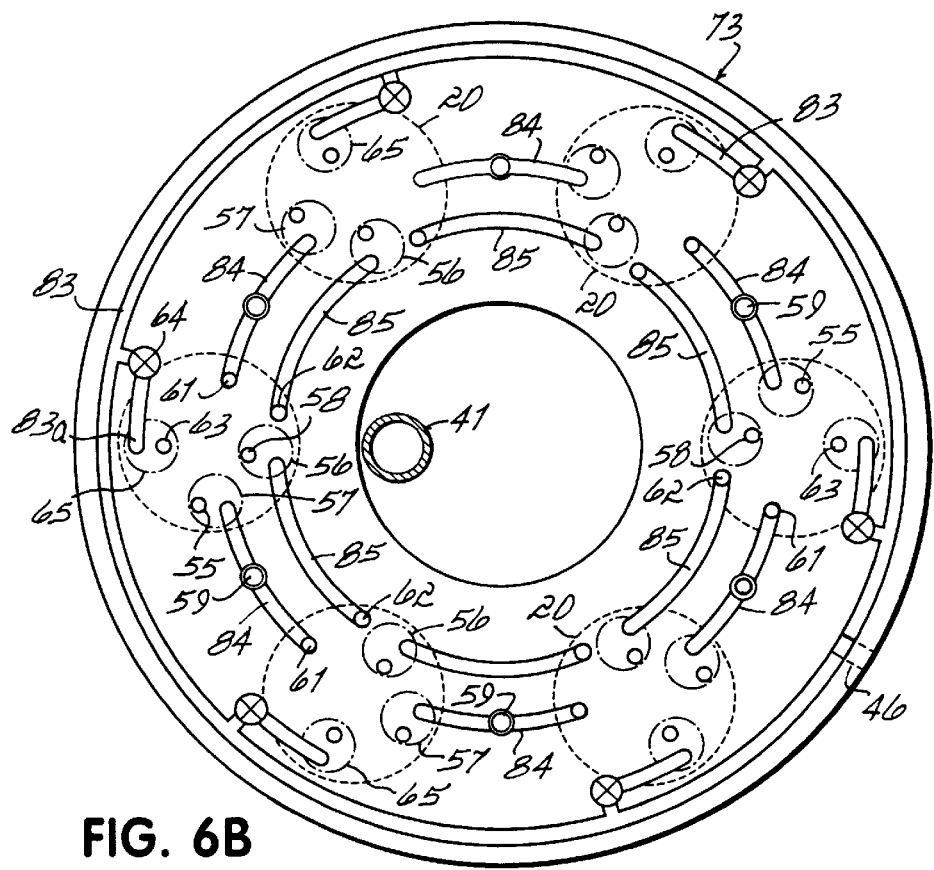
Figure 6C:
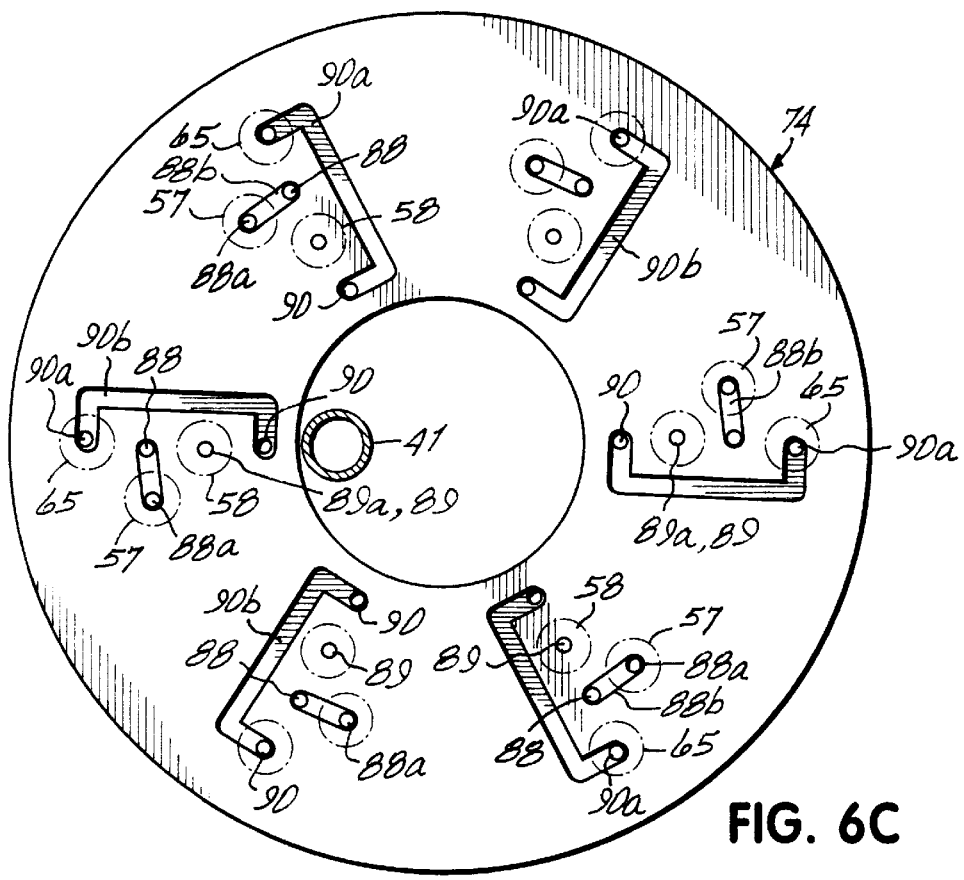
Figure 6D:
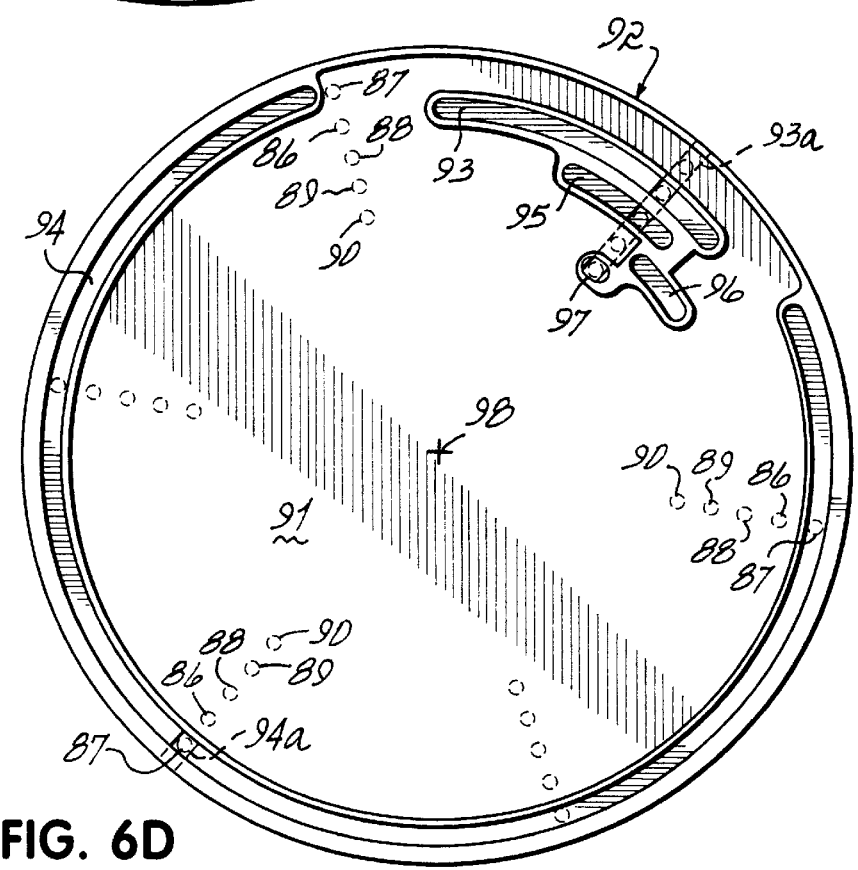

The concentrator 11, contained within the housing 13, includes a plurality of molecular sieves 20, preferably three to ten in number, and more preferably four to six in number. In the illustrated embodiment, the preferred number of six sieves 20a–20f is provided. Each of the sieves 20 is preferably in the form of a cylindrical canister 21 filled with porous granules 22 or particles of a material such as zeolite (FIGS. 2 and 4). The granules 22 selectively adsorb water vapor and gaseous impurities from pressurized air brought in contact therewith and further adsorb other gases in an order of priority, with nitrogen being adsorbed from the air in preference to oxygen and argon. The sieves 20 each have an inlet side 23 at the bottom thereof and an outlet side 24 at the top.

The general function of the sieves 20 in concentrating oxygen is known in the art. Inlet gas, usually air, is pumped into the inlet side of a sieve 20 and pressurized to 20 to 50 psi within the canister 21. In the illustrated embodiment, 30 psi is preferred. Under such pressures, water vapor, impurity gasses and nitrogen, which typically make up about 79 percent of the incoming air are adsorbed into the particles 22. This leaves a gas mixture of the remaining components that constitute 21 percent of the incoming air, which typically has a composition of about 96% oxygen and 4% argon. This 96% oxygen product can be removed from the outlet side 24 of the sieve 20 while maintaining sufficient pressure to keep the adsorbed components from being dissolved from the particles 22. This 96% concentration of oxygen is attainable as long as the particles 22 have not become saturated with the nitrogen and other removed components, which would result in nitrogen passing through to the outlet side of the sieve 20, diluting the concentration of the oxygen from the product gas. Therefore, periodic cycling of the pressure back to atmospheric pressure from the inlet side 23 of the sieve 20 is carried out to purge the particles 22 of the adsorbed gasses and to refresh the sieve 20 for another cycle.

Further referring to FIG. 2, the sieves 20 are arranged in the housing 13 in a circular array, for example, with their axes vertically oriented and equally spaced from a control vertical axis of the concentrator 11. At the lower or inlet sides 23 of the sieves 20 are mounted six sets of inlet side valves, one set for each of the sieves 20a–20f, preferably contained in a single inlet side valve assembly 25. Similarly, at the upper or outlet sides 24 of the sieves 20 are mounted six sets of outlet side valves, one set for each of the sieves 20a–20f, preferably also in a single outlet side valve assembly 26. Below the inlet side valve assembly 25 is a pump or air compressor 30 driven by an electric pump motor 29. The motor 29 is located in the center of the array of sieves 20. The pump 30 is preferably a positive displacement centrifugal pump of the type described in U.S. Pat. No. 5,484,268 to Robert P. Swank and assigned to Impact MST Incorporated, the assignee of the present invention, which patent is hereby expressly incorporated by reference herein. Such a pump has a particular suitability for the use in an oxygen concentrator 11 in that it is small and light for a pump that is capable of producing several standard liters per minute (SLM) of output at several atmospheres of pressure, and in that it does not require lubricants that can contaminate the output air. For the embodiments illustrated herein, the pump or compressor 30 is preferably capable of producing approximately 1 SCFM (one standard cubic foot per minute), or 30 SLM of flow at a pressure of 30 psi. The pump 30 has an air inlet 31 around its perimeter through which air is drawn by the pump 30 from the inside of the housing 13, through the cavity 32 within the housing 13, past the sieves 20 from an air intake 33 at the top of the housing 13. Somewhere between the intake 33 and the air inlet 31 of the pump may be provided one or more dust or bacteria filters. In addition, a muffler is preferably provided in the inlet 31. The pump or air compressor 30 has a high pressure air outlet 34 that is connected to the inlet side valve assembly 25.

An exhaust manifold and fan assembly 35 is mounted below the pump 30. The fan assembly 35 is mounted on the shaft of the motor 29 below 10 the pump or compressor 30 and is driven along with the pump 30, either directly or through a speed changing gear or belt assembly (not shown) at the end of the shaft 29. The fan 35 should have a capacity of delivering about 50 to 60 CFM at low pressure. The fan 35 has an annular inlet 35a that surrounds the motor 29 through the valve assembly 25, so that air is drawn into the chamber 32 from the top of the housing 11, around the sieves 20 and past the motor 29 to the inlet 35a, thereby cooling the motor 29. An exhaust port 36 extending from the inlet side valve assembly 25 also serves as an inlet to the pump 34. The fan assembly 35 further has exhaust outlet ports 37 that communicate with the ambient atmosphere outside of the housing 13. The fan assembly 35 has a seal 38 around its periphery that seals the fan assembly 35 to the housing 13 to isolate the chamber 32 from exhaust ports 37. A muffler may also be provided at the exhaust ports 37.

On the top of the outlet side valve assembly 26 of the first embodiment of the invention is mounted a control valve assembly 40 driven by an electrical motor 40a, which cycles the valve assembly at a precisely maintained rate, for example, 10 RPM. The cycle rate may be varied over a range of from one to 100 RPM, depending on the number of sieve beds and on the sieve size and design, but a rate of from 4 or 5 RPM to 20–40 RPM is more likely to be the most practical range, producing cycle times of from 1.5 to 15 seconds for a six sieve bed system. According to one embodiment of the invention, the control valve 40 is a rotary aperture control valve that controls pilot air to each of the controllable valves of the valve assemblies 25 and 26. The pilot air, in this embodiment, is communicated to the control valve 40 through a duct 41 connected through a check valve 41a (FIG. 4) from the high pressure outlet of the pump 30. The duct 41 is of sufficient diameter, approximately 3 cm for example, so as to serve as a pressurized control air reservoir. In addition, the duct 41 should be oriented so that any condensate that might accumulate, which usually is significant only on startup, will flow away from and not clog the valves and eventually evaporate during concentrator operation. The duct 41 may include additional volume to hold moisture absorbing material such as silica gel crystals through which the control air may pass. Similar provision may be made to prevent condensate from entering the sieves 20 by providing for a similar dehumidification in line with the inlet line 34. The pilot air from the control valve 40 is communicated to each of the valves of the lower or inlet side valve assembly 25 through two sets of conduits 43 and 44, and to each of the valves of the upper or outlet side valve assembly 26 through ducts between the control valve 40 and assembly 26 (not shown). The control air conduits 43 and 44 to the respective inlet valves 53 and outlet valves 54 are distributed at angular intervals around the valve 40 and downward to the lower manifold 72, where they connect through passages therein to the control ports of the inlet valves 53 and outlet valves 54. The references to valves, e.g. valve 53, refer collectively to the corresponding individual valves 53*a–f* of the individual sieves 20*a–f*. Above the control valve 40 is mounted an oxygen product gas reservoir 45, which is connected through a product outlet duct 46 from the outlet side valve assembly 26. The product gas reservoir 45 has an outlet 47 that connects to a pressure regulator 48 and from the pressure regulator 48 through a flow control valve 49*a*, which is responsive to the setting of the flow control knob 14 (FIG. 1), and a flow meter 49, which drives the flow indicator 15 (FIG. 1), to the product outlet tube 19 to which the intake of the humidifier 11 is connected.

Figure 3:
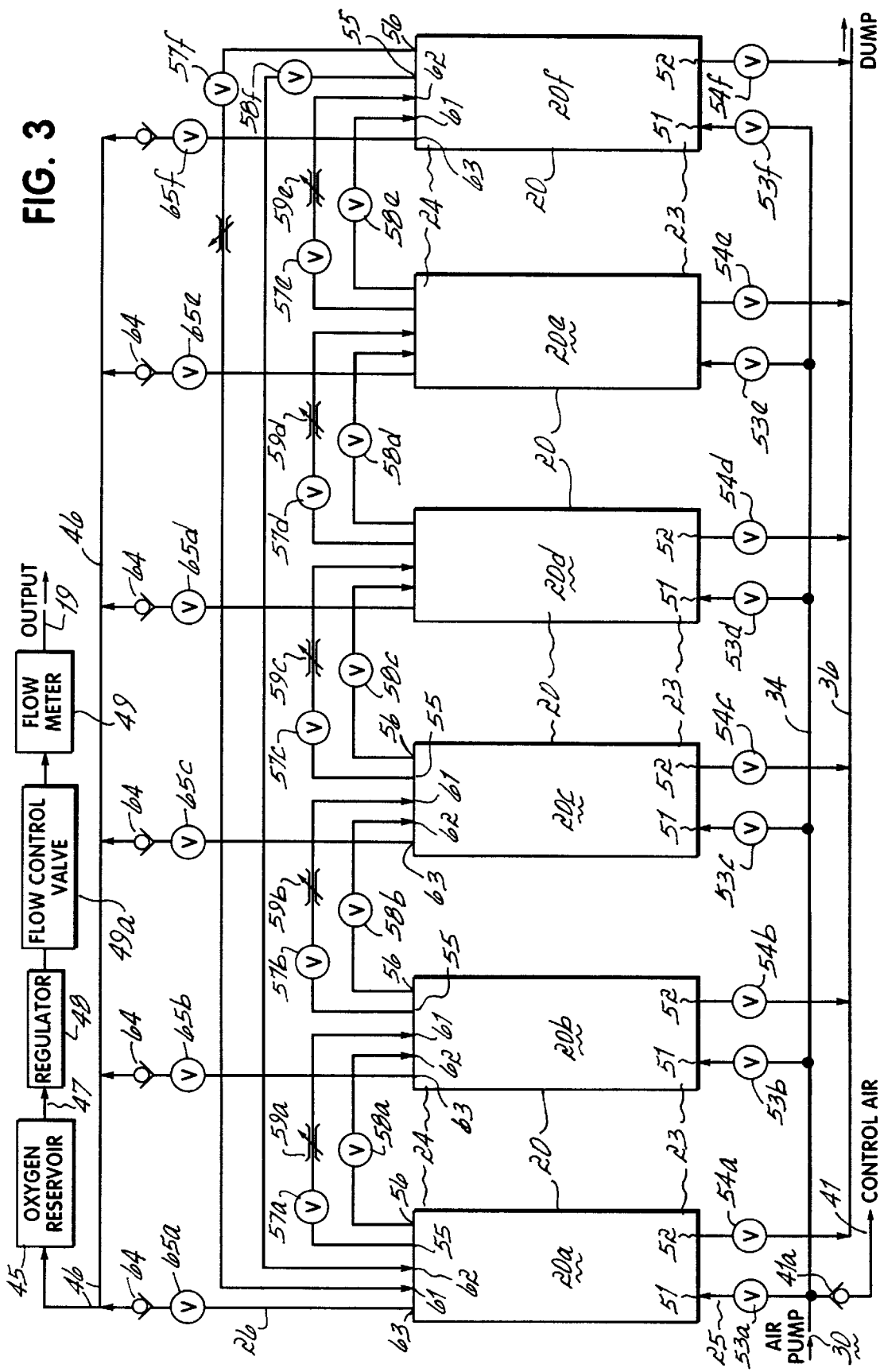
FIG. 3 is a schematic diagram of the oxygen concentrator of FIG. 2.

The interconnections of the sieves 20 and the valves of the assemblies 25 and 26 are diagrammatically illustrated in FIG. 3, which shows each of the sieves 20*a–20f* and the inlet sides 23 and outlet sides 24 thereof. Each of the sieves 20 has two ports on the inlet side 23 thereof, including an inlet port 51 and an exhaust port 52. Each of the inlet ports 51 is connected through a pilot controlled diaphragm valve 53 to the high pressure outlet 34 of the pump 30. Each of the exhaust ports 52 is connected through a diaphragm controlled exhaust valve 54 to the exhaust port 36 and the fan assembly 35. The valves 53 and 54 may be valves of types other than diaphragm types of valves that perform the same or a similar function. For example, two way mechanical valves that selectively connect a port 51 or 52 to the high pressure inlet 34 or the exhaust port 36 may be substituted for the diaphragm valves 53 and 54. In the case of mechanical valves, they would preferably be contained the control valve assembly 40, which would, for example, be driven by cams. This mechanical valve embodiment is discussed in more detail in the description of FIG. 10. The valves 53 are sometimes referred to herein as the sieve inlet valves while the valves 54 are sometimes referred to herein as the dump valves.

The outlet side 24 of each of the sieves 20 is provided with five ports or port connections, including one or more crossover ports 55,56 that are each connected through a respective one of diaphragm valves 57,58 to an adjacent sieve 20, preferably to the outlet side 24. Port 55 of each sieve 20 is a purge port, which is connected through the valve 57 and a flow restriction valve 59 with a port 61 in the outlet side 24 of the adjacent sieve, that is from sieve 20*a* to sieve 20*b*, from 20*b* to sieve 20*c*, from sieve 20*c* to sieve 20*d*, from sieve 20*d* to sieve 20*e*, from sieve 20*e* to sieve 20*f*, and from sieve 20*f* to sieve 20*a*. The port 56 of each sieve 20 is a pressure equalization port that preferably connects to a port 62 of the correspondingly adjacent sieve 20 through a corresponding one of valves 58. This port 62 may, alternatively, be provided in the inlet sides 23 of the sieves 20. The outlet sides 24 of each of the sieves 20 is further provided with a product outlet port 63 that connects through a pilot controlled diaphragm valve 65 and then a check valve 64 to the inlet 46 of the reservoir 45. The valves 57 are sometimes referred to herein as the purge valves, while the valves 58 are sometimes referred to herein as the pressure equalization valves. The valves 65 are sometimes referred to herein as the product outlet valves. Hereafter to a valve or port of a specific one of the sieves 20*a–20f* may be referred to with a corresponding letter suffix as, for example, port 51*a* of sieve 20*a* or valve 65*e* of sieve 20*e*, etc.

One acceptable set of arrangements of the valves 53, 54, 57–59, 64 and 65 is represented in FIGS. 4, 5 and 6A–6D, which show each of the valve assemblies 25 and 26 each made of two plates or manifolds. The inlet side valve assembly 25 is made up of a main manifold 71 which houses the ducts that direct the inlet and exhaust gases, and a pilot or control air manifold 72, which houses the ducts that directs control air to operate the valves. The outlet side valve assembly 26 is similarly made up of a main manifold 73 and a control air manifold 74. The manifold 71 contains the ducts that connect the ports 51 to inlet valves 53 through which they are selectively connectable through a duct 81 to the high pressure outlet 34 of the pump 30. Similarly, manifold 71 contains the ducts that connect the ports 52 to dump valves 54 through which they are selectively connectable through a duct 82 to the low pressure outlet 36 to atmosphere through the fan 35. Manifold 73 contains the ducts that connect the ports 63 with the outlet valves 65 through which they are selectively connectable to a duct 83 through ducts 83*a* and check valves 64 to the product outlet 46 to the reservoir 45. Manifold 73 also contains ducts that connect ports 55 to the purge valves 57 through which they are selectively connectable to a respective one of a set of ducts 84 that connect through flow restriction valves 59 to ports 61 of an adjacent sieve 20. Manifold 73 further contains ducts that connect ports 56 to pressure equalization valves 58 through which they are selectively connectable through a respective one of a set of ducts 85 to ports 62 of an adjacent sieve 20.

The ports 51, 52, 55, 56 and 61–63 are preferably also carried in and through washer extender discs 71 a for the inlet sides 23 and 73*a* for the outlet side 24 of the sieves 20. These discs 71 a and 73*a* may be separately formed, as illustrated, or may be integrally molded or otherwise integrally formed with the manifolds 71 and 73, respectively. The discs 71*a* and 73*a* extend into the cylindrical canister walls 21 of the sieves 20 to communicate through a porous wave washer compression element 75 and spacer washer 76 on the inlet side 23, then, on both the inlet and outlet sides 23,24, through a mesh screen 77 and filter medium 78. The wave washer 75 may alternatively be a compression spring having approximately one half inch of compressibility. The wave washer compression element or compression spring 75 facilitates compression of the particles 22 in the cylinder 21 and accommodate for variations in the volume occupied by the particles 22. The spacer washer 76 has a plurality of holes through it so gas will flow through it with little resistance. The mesh 77 and filter paper 78 facilitate the flow of gas between the particles 22 and the ports 51, 52, 55, 56 and 61–63 and prevent any fine particles or powder from escaping the sieves 20. The cylindrical bodies 22 of the sieves 20 seal to the manifolds 71 and 73 through seals 79, and thereby the manifolds 71 and 73 form end covers of the sieves 20. Each of the sieves 20 preferably has an actual volume of about 50 cm$^3$ of uncompressed zeolite. Preferably, the volume of all of the ports and valves associated with each sieve 20 is not more than approximately 5 percent of the sieve output volume per cycle of each sieve 20. The output or working volume of a 50 cm$^3$ sieve cycling between atmospheric pressure and 30 psi, or about two atmospheres above ambient, is about 33 cm$^3$ per cycle, allowing a maximum loss of about 1.67 cm$^3$ per cycle per sieve. This allows for ducts to be about ⅛th inch in diameter in the manifolds, with the manifold plates not more than about ⅜ths inches thick.

The manifold 72 is firmly secured to the bottom of the manifold 71 on the inlet or lower side of the sieves 20 and holds between it and manifold 71 a diaphragm plate 70 in a sealable relationship with both of the manifolds 71 and 72. The portions of the diaphragm plate 70 that intersect the valves 53 and 54 are moveable, with control air applied through control ducts 86*a* and 87*a*, respectively, in the valve cavities within the manifold 72, to selectively open or close the valves 53 and 54. Similarly, manifold 74 is firmly secured to the top of the manifold 73 on the outlet or upper side of the sieves 20 and to hold between it and the manifold 73 a diaphragm plate 80 in a sealable relationship with both of the manifolds 73 and 74. The portions of the diaphragm plate 80 that intersect the cavities of the valves 57, 58 and 65 are similarly moveable, with control air applied through control ducts 88a, 89a and 90a, respectively, in the manifold 74, to selectively open or close the valves 57, 58 and 65. The ducts 88a, 89a and 90a respectively connect to holes 88–90 in housing 99 of the control valve assembly 40. The ducts 88a and 90a are out of vertical alignment with holes 88 and 90 and are interconnected by channels 88b and 90b, respectively, in the top of manifold 74 to connect the unaligned ends of the holes 88 and 90. These channels are sealed at their tops against the body of the valve assembly 40 which is bonded or tightly bolted to the top of manifold 74.

In the embodiment of the invention in which diaphragm valves are used, control air is selectively applied to the ducts 86–90 by the rotary aperture control or timing valve 40. The ducts 86a and 87a to the inlet side manifold 72 are connected through conduits 43 and 44 from ducts 86 and 87, respectively, in housing 99, while the ducts 88–90 connect directly from the housing of the timing valve 40 to the manifold 74 to which the timing valve 40 is mounted. Pressurized control air is communicated to the timing valve 40 through duct 41 (FIG. 5) connected from the high pressure outlet 34 of the pump 30 to a plenum area 91 formed by the indentation on the bottom of a rotatable aperture plate 92 in the timing valve 40 selectively apply the pressurized control air from the plenum area 91 to the control ducts 86–90 of the valves 53–56 and 65 of each of the sieves 20 through apertures 93–97 in the plate 92. The plate 92 rotates once per cycle. In the preferred embodiment, the plate 92 rotates ten times per minute, cycling the valves of each sieve every six seconds. The cycles of each of the sieves 20 are 60° out of phase with the adjacent sieves 20, which is provided by spacing the apertures 86–90 of the sieves 20 at intervals of 60° around the axis 98 of the plate 92. A timing diagram illustrating the respective portions of the cycle during which the valves of the sieves 20 are opened (higher state) and closed (lower state) is presented in FIG. 7. The apertures 93–97 in the plate 92, in FIGS. 5 and 6D, determine those portions of the cycles of the sieves 20 at which the respective duct 86–92 is vented to atmospheric or low pressure, through ducts 93a and 94a in plate 92, to open the respective valve 53, 54, 57, 58 and 65. The ducts 93a and 94a vent through the outer rim of the aperture plate 92 into a channel 99 on the inside of the cover 92a of the valve assembly 40, which channel is vented through spaced holes in the cover 92a to the unpressurized atmosphere within the housing 12 of the concentrator 11. At other times in the cycle, pressurized control air from the duct 91 is communicated to the valves to force the valve diaphragm against the main manifold, thereby isolating the ducts from each other to close the valves. The plate 92 rotates counter-clockwise in FIG. 7.

Figure 7:
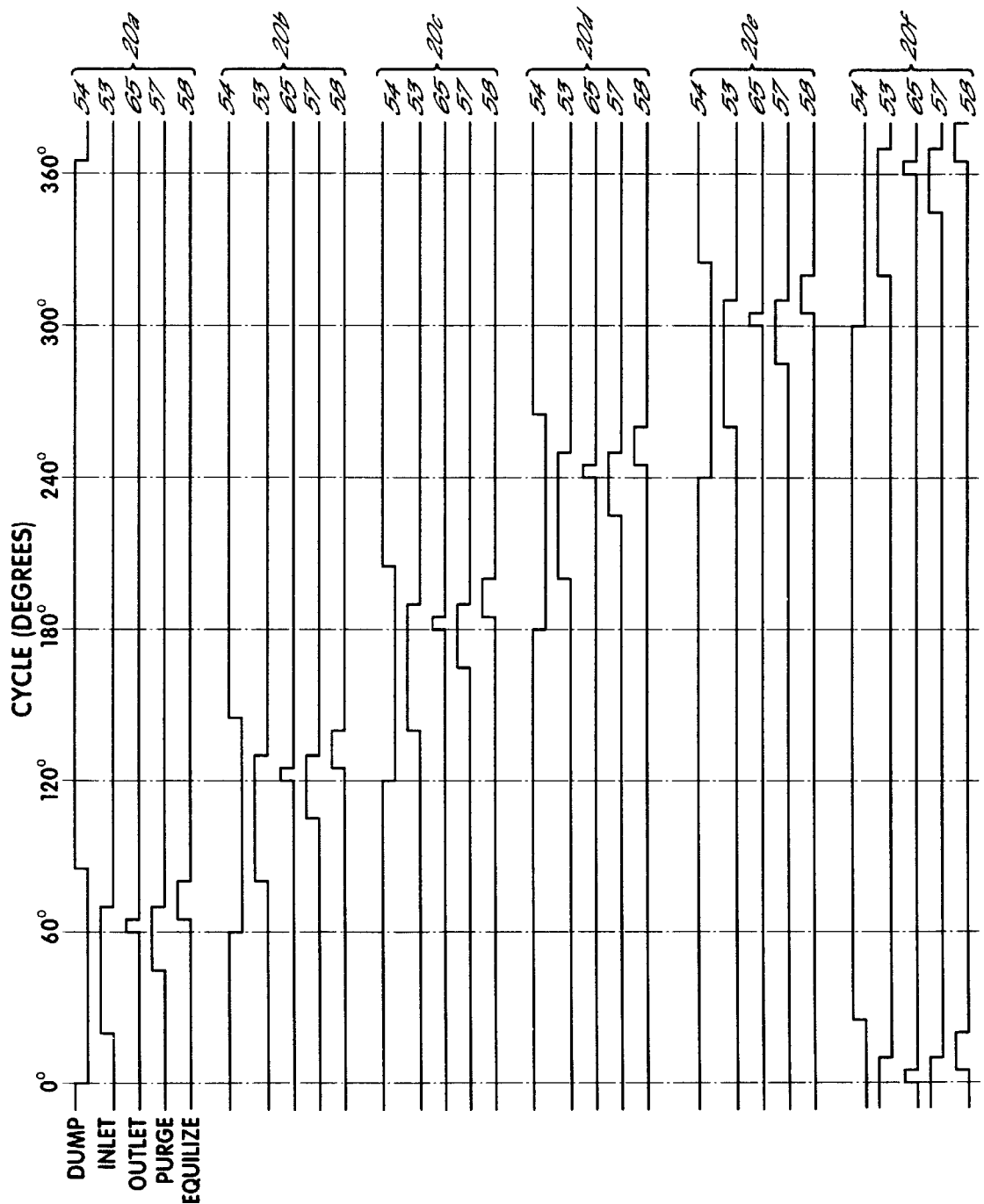
FIG. 7 is a timing diagram of the valves of the embodiment of FIG. 4 illustrating the relative operation of the valves of the different sieve beds over the 360° of a cycle.
Figure 8:
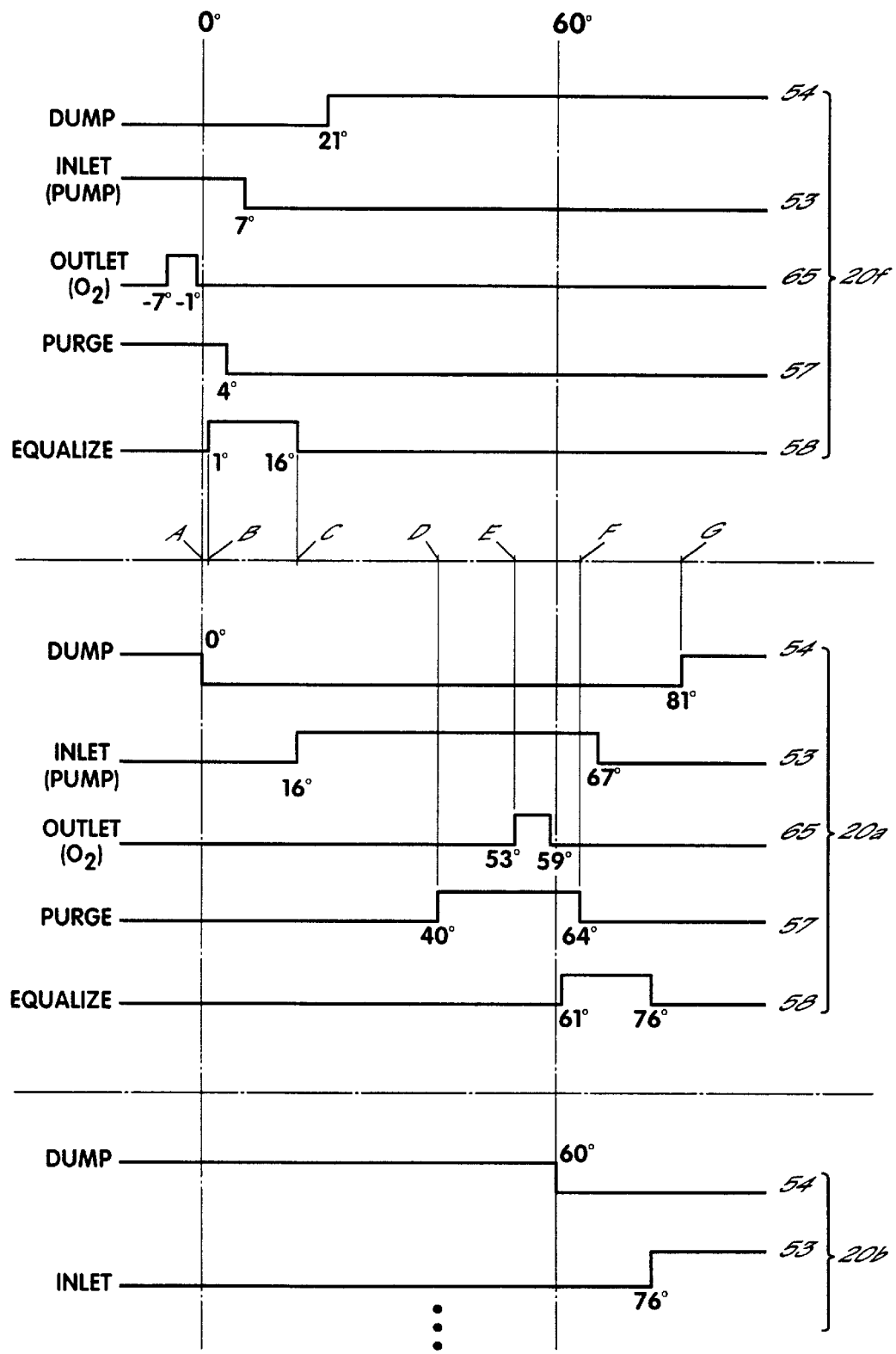
FIG. 8 is a more detailed timing diagram of a portion of the diagram of FIG. 7 illustrating in detail the preferred relative timing of the valves of a single sieve bed.
Figure 9:
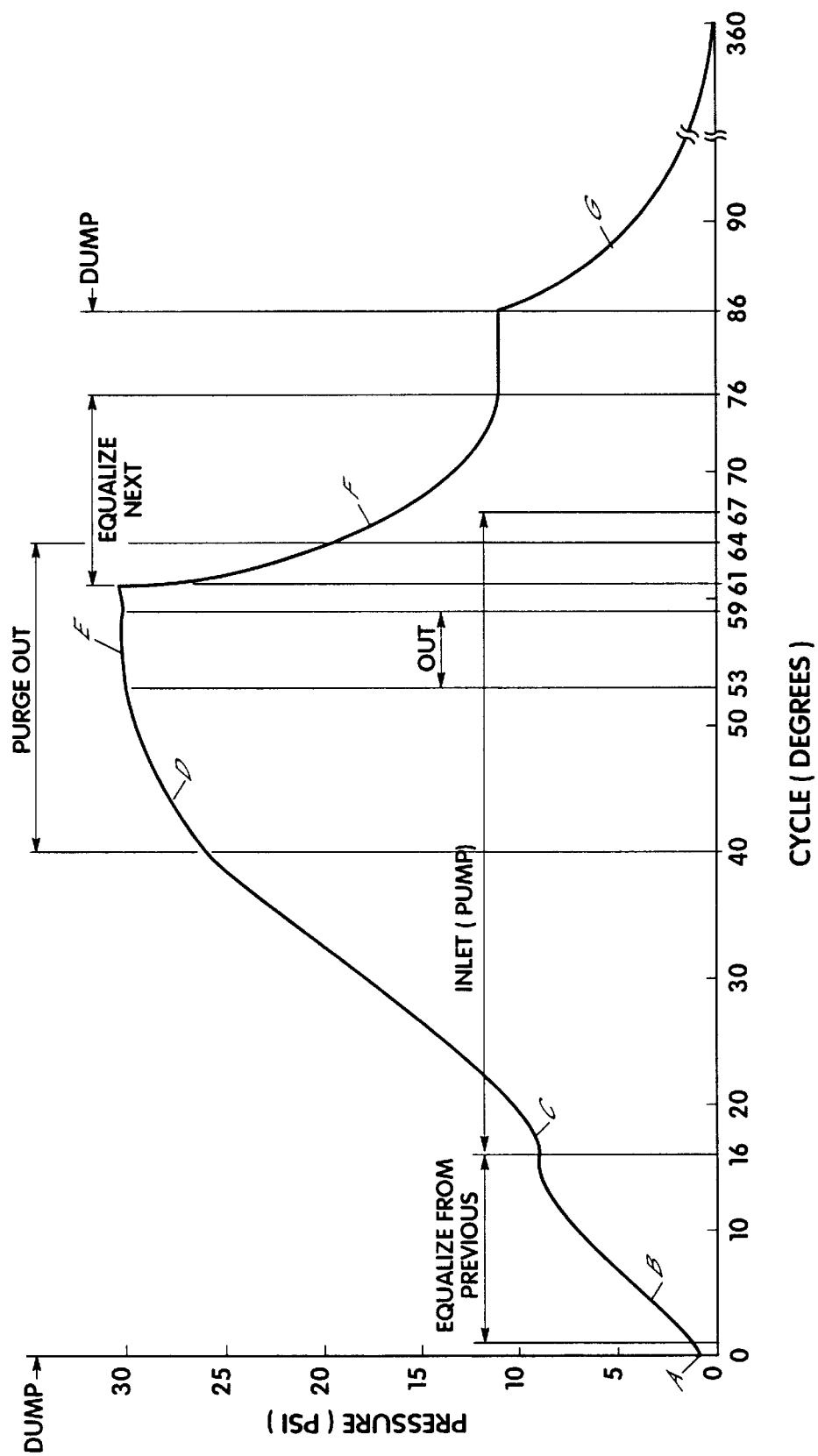
FIG. 9 is a diagram of the pressure within a bed as a function of the portion of the cycle illustrated by the timing diagram of FIG. 8.

The cycle of operation of the concentrator 11 can best be understood by first considering the portion of the cycle that relates to one of the sieves 20 of this embodiment, for example, sieve 20a, particularly by reference to FIG. 8 (which is a more detailed timing diagram of the portion of the diagram of FIG. 7 that relates to sieve 20a) and to the sieve pressure diagram of FIG. 9, as well as to the timing valve aperture plate diagram of FIG. 6. At the top in FIG. 8 is illustrated the timing of sieve 20f, which appears at the bottom in FIG. 7. This is to show that the cycle of the previously cycled sieve, sieve 20f, is relevant to the operation of sieve 20a.

Figure 3A:
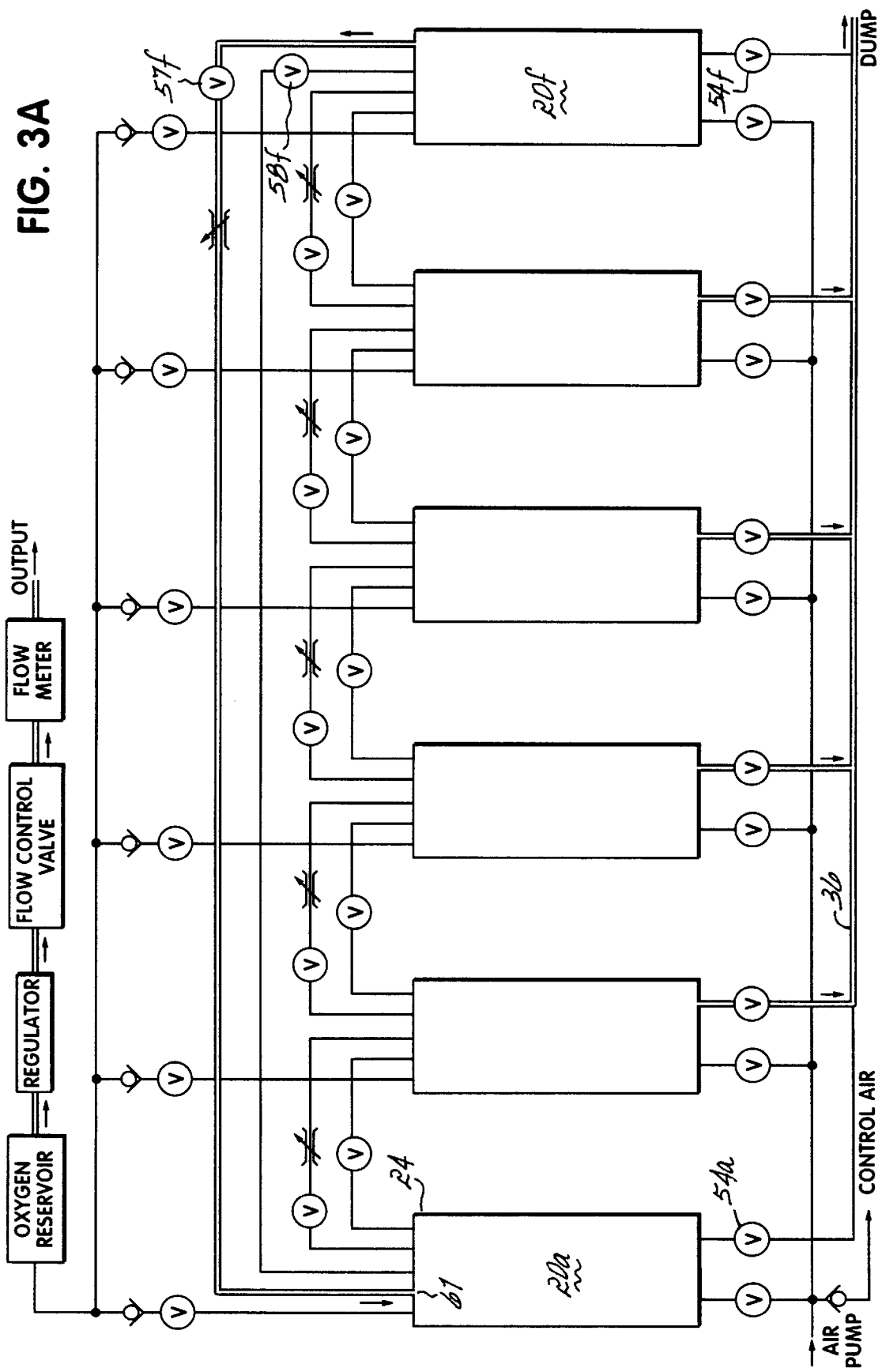

The beginning of the cycle is represented as 0°, which is the position of the aperture plate 92. At this point, the dump valve 54, which connects the inlet side 23 of sieve 20a to atmosphere, has been open for about 4.6 seconds of the six second cycle, and, as will be explained below. At this 0° point in the cycle, a small stream of oxygen-rich purge gas has been flowing backward from the previously cycled sieve, sieve 20f, to the outlet side of sieve 20a through port 61a thereof. Sieve 20a is in its most fully purged state and is at the end of the depressurization portion of its cycle. The pressure in sieve 20a is at its minimum, as illustrated at A in the pressure diagram of FIG. 9. At this point in the cycle, the dump valves 54 of sieves 20b–20e are open and the other valves of these sieves are closed, so the sieves 20b–20e are in the main depressurization portions of their cycles, venting to atmosphere through duct 36 from port 52 in their inlet sides. The pressures in each of the beds 20b–20e is dropping toward but is not yet at, their minimums. The gas flow through the concentrator 11 at this point is illustrated in FIG. 3A. At this point, the dump valve 54f of sieve 20f remains closed while its purge valve 57f is open, bleeding a small amount of oxygen rich gas into the port 61a in the outlet side 24 of sieve 20a. At this 0° point, the dump valve 54a of sieve 20a closes, beginning the pressurization portion of its cycle.

Figure 3C:
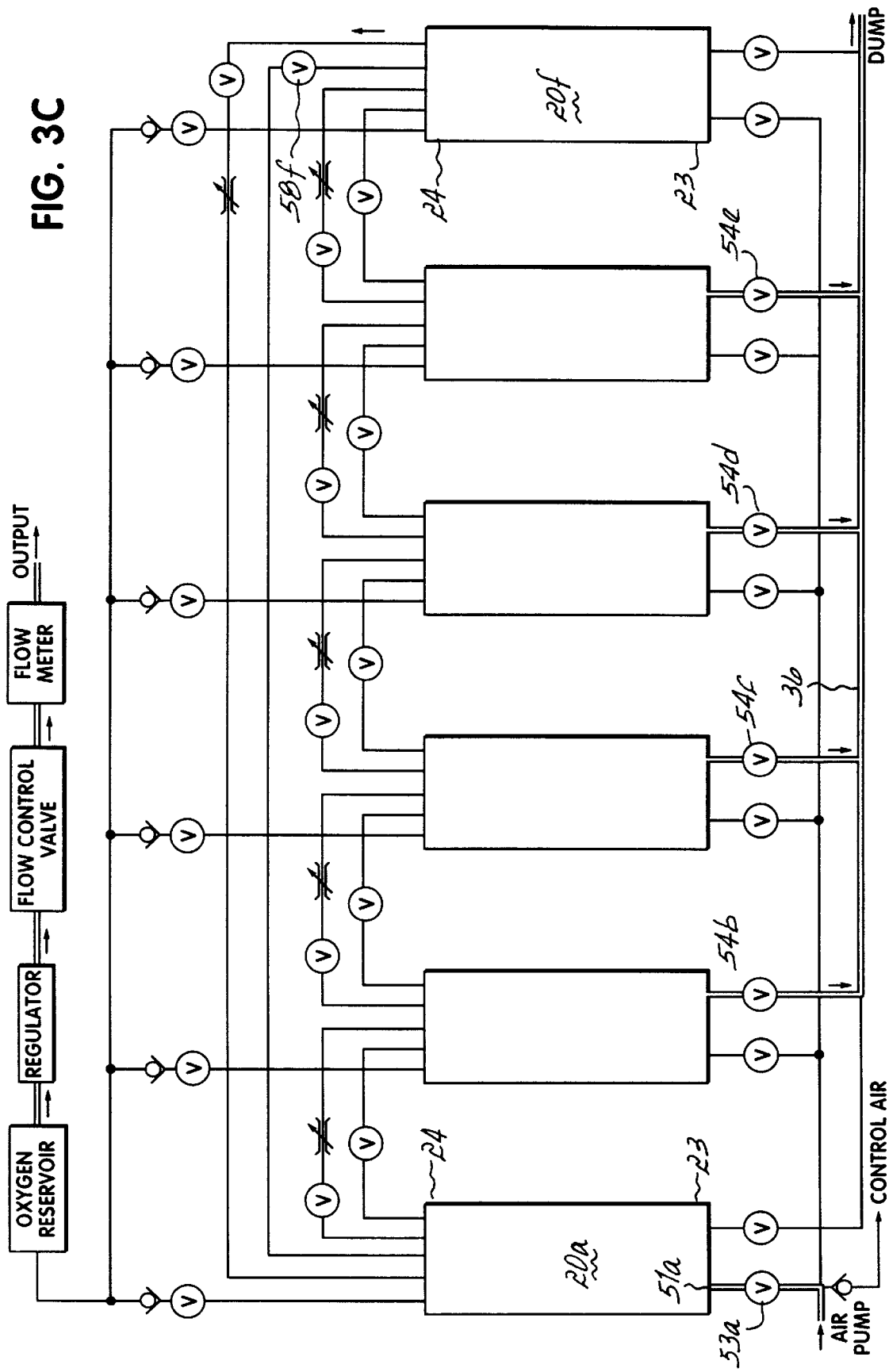

At a nominal instant after valve 54a closes, for example at 1° into its cycle, the pressure equalization valve 58f of sieve 20f opens, causing oxygen rich gas to flow from sieve 20f into port 62a at the outlet side 24 of sieve 20a, as illustrated in FIG. 3B. At this point, the pressure in bed 20f drops, while the pressure in bed 20a rises, as illustrated at B in FIG. 9. A purpose of this pressurize equalization position of the cycle is to utilize the energy remaining in the compressed gas in sieve 20f while also salvaging oxygen rich gas to partially fill the next sieve, sieve 20a. While valve 57f may remain open for a few additional degrees at this portion of the cycle, its contribution is now insignificant. This equalization portion of the cycle continues until about 16° into the cycle, at which point the equalization valve 58f closes, while the inlet valve 53a of sieve 20a opens, causing air to flow through port 51a into sieve 20a, as illustrated in FIG. 3C. The pressure in sieve 20a thereupon continues to rise, as illustrated at C in FIG. 9. While the pressure equalization is illustrated here to direct gas from the outlet side 24 of one sieve (sieve 20f) to the outlet side 24 of the next sieve (sieve 20a), an alternative pressure equalization sub cycle can be carried out by directing gas from the outlet side 24 of one sieve into the inlet side 23 of the next sieve.

At 21° into the cycle, the dump valve 54f of sieve 20f opens to begin the main depressurization portion of its cycle, which has no effect on the sieve 20a at this point in the cycle. In addition, at 40° into the cycle, the purge valve 57a of sieve 20a opens, flowing a small amount of oxygen rich gas into port 61b of sieve 20b and backward through sieve 20b, through its dump valve 54b, which is open. This is illustrated in FIG. 3D. During these valve state changes, the pressure in sieve 20a continues to rise to a maximum as air is pumped into its inlet side through port 51a, as illustrated at D in FIG. 9. Then, as the pressure in sieve 20a reaches its maximum and before the sieve 20a becomes saturated and thereby allow unvented nitrogen to pass through to the outlet side 24 of sieve 20a, the outlet valve 65a opens in a brief pulse, lasting from about the 53° to 59° points of the cycle, to allow the concentrated oxygen (a gas mixture of about 96% oxygen and 4% argon), to flow through the outlet 46 to the product reservoir 45, as illustrated in FIG. 3E. At this point, even though pressurized air is flowing into the inlet side 23 of sieve 20a, the pressure in sieve 20a might tend to drop slightly toward the pressure of the product reservoir 45, as illustrated at E in FIG. 9, or at least the slope of the line or rate of the pressure rise will be slightly reduced. Except upon initialization or start-up of the concentrator 11, the reservoir pressure is only a few psi below the maximum sieve pressure, so that output of the product gas to the reservoir does not start the desorbtion of nitrogen or other adsorbed gases from the sieve 20a.

Figure 3F:
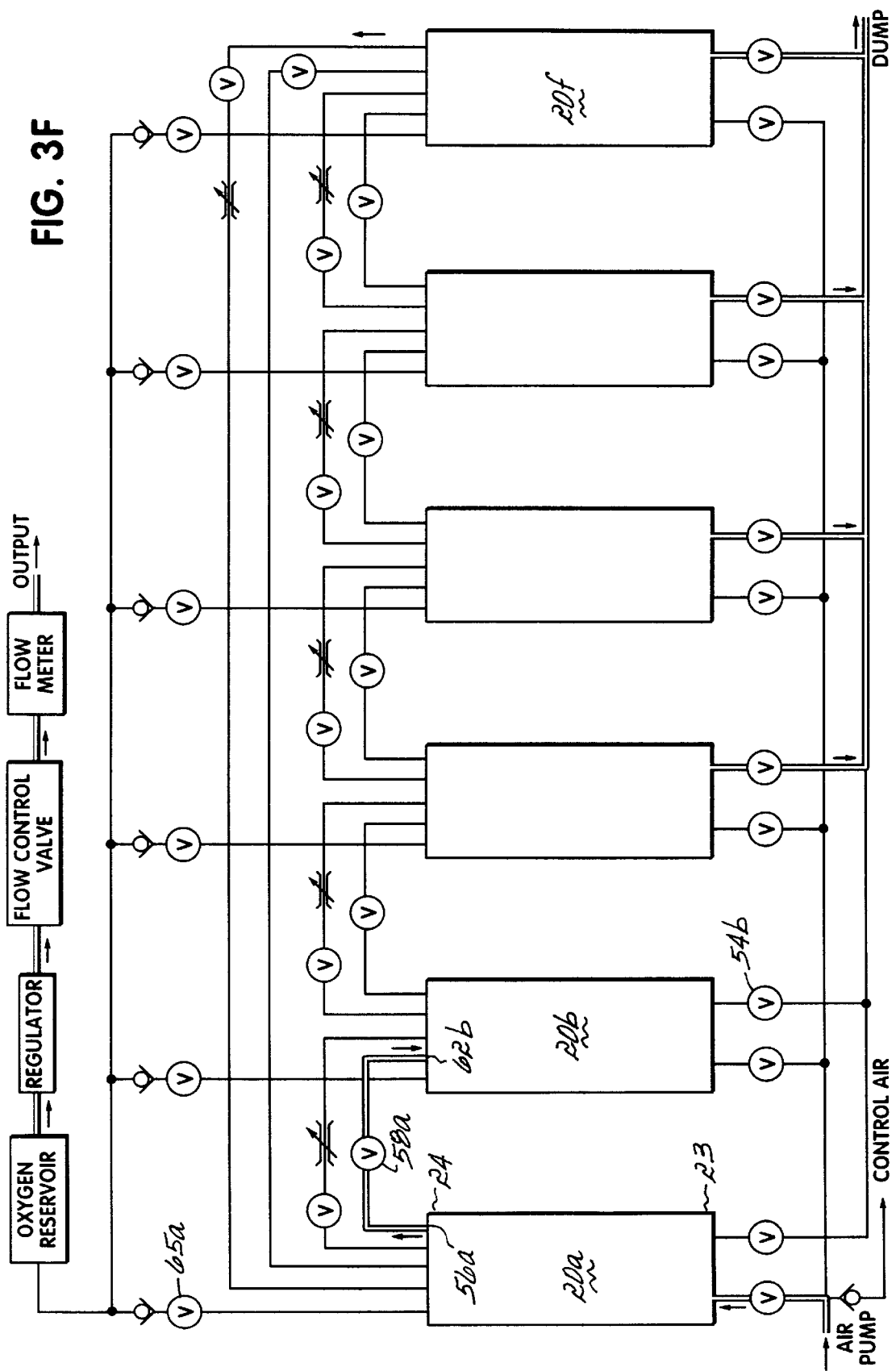
Figure 3G:
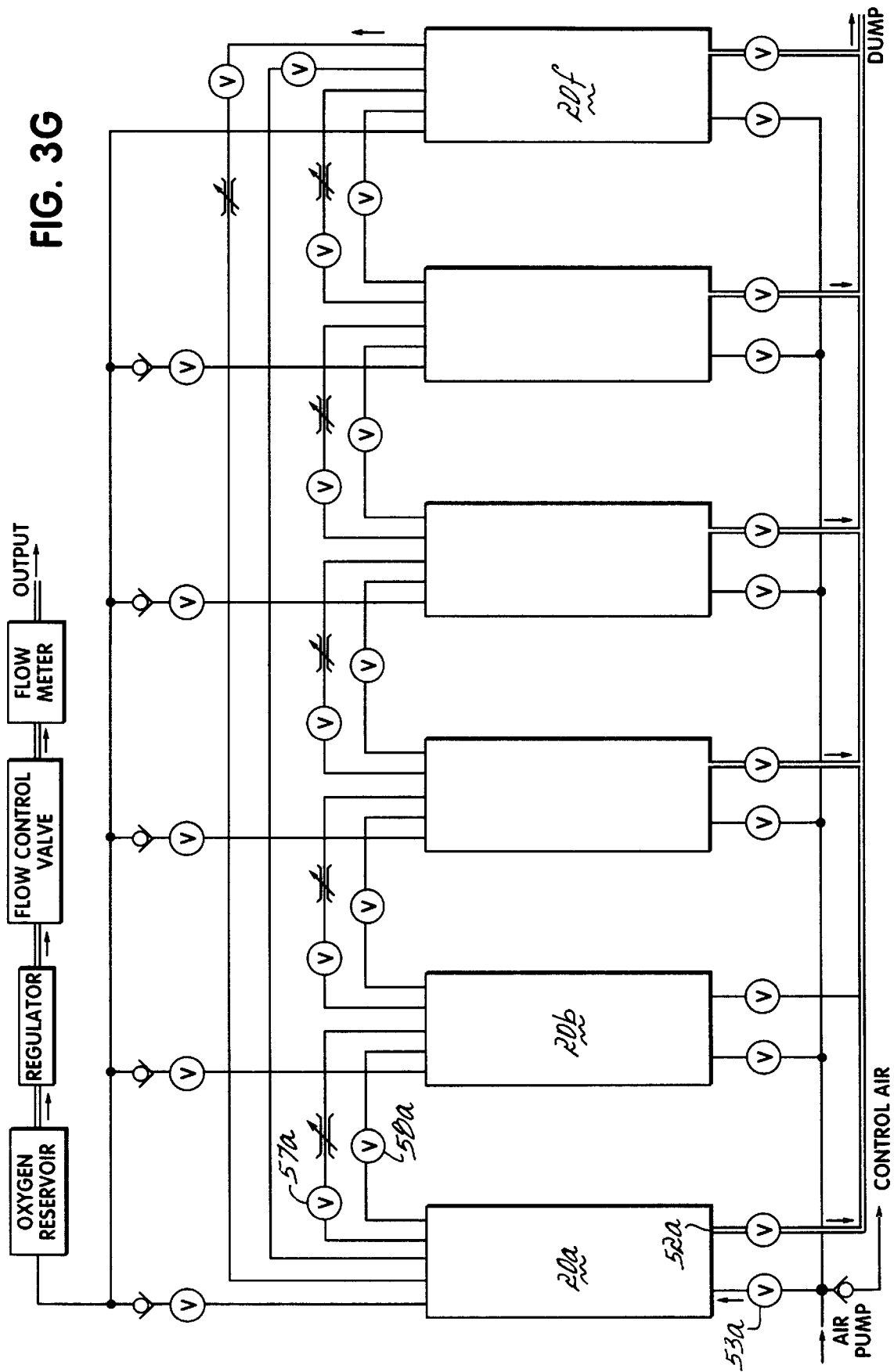

Approaching the 60° point in the cycle, three things happen in close sequence. First, at 59°, the outlet valve 65a closes, as mentioned above, then, at 60°, the dump valve 54b of the next sieve, sieve 20b, closes. Since sieve 20b is 60° behind sieve 20a in phase, sieve 20b is, at this point, ready to begin the pressurization portion of its cycle, to follow the pressure curve starting at A, as described above for sieve 20a. At 61°, the pressure equalization valve 58a opens, allowing oxygen rich gas to flow from the port 56a of sieve 20a to the port 62b on the outlet side of sieve 20b, as illustrated in FIG. 3F, which begins the pressurization of sieve 20b (which is at B in its cycle), while the pressure in sieve 20a thereupon drops, as illustrated at F in FIG. 9. Then, purge valve 57a closes at 64°, inlet valve 53a closes at 67°, equalization valve 58a closes at 76° and dump valve 52a opens at 81°, whereupon sieve 20a enters the main depressurization portion of its cycle, dumping gas to atmosphere from the inlet side thereof, as illustrated in FIG. 3G, whereupon its pressure drops toward the minimum, as illustrated at G in FIG. 9. Also, from the time the inlet valve 53a closes at 67° until the inlet valve 53b of the next sieve 20b opens at 76°, the check valve 41a will open causing the pump 30 to direct its output into the control air tube and reservoir 41.

In the concentrator 11, the portion of the cycle of each sieve 20 during which the pressure is increasing from minimum to maximum is substantially shorter than the portion of the cycle in which the pressure is declining back to its minimum. Preferably, the entire portion of the cycle in which the dump valve is closed is substantially shorter in duration than the portion of the cycle during which the dump valve is open. Preferably, the ratio of dump valve open to dump valve closed approaches at least approximately 2 to one, which is appropriate for a three sieve concentrator, for example. Preferably the ratio is about 3 or 4 to one, and more preferably, approaches approximately 5 to one, which is suitable for a six sieve concentrator. For a six sieve concentrator, the ratio is more precisely about 4.5 to one, as in the illustrated embodiments described above. It is more particularly preferred that the portion of the cycle from the minimum pressure of a sieve, through the pressure equalization into the sieve, pump air into the sieve and output of product $O_2$ rich gas from the sieve is not more than half the depressurization portion of the cycle, and preferably approaches one divided by the number of sieves 20 in the concentrator 11. The purpose of this asymmetry to the cycle is to optimize the function of the sieves by allowing sufficient time for the sieves to desorb the nitrogen and other adsorbed gases but to take advantage of the ability of the sieves to adsorb such gasses at a much faster rate, thereby increasing product gas output with relatively small sieves.

Figure 10:
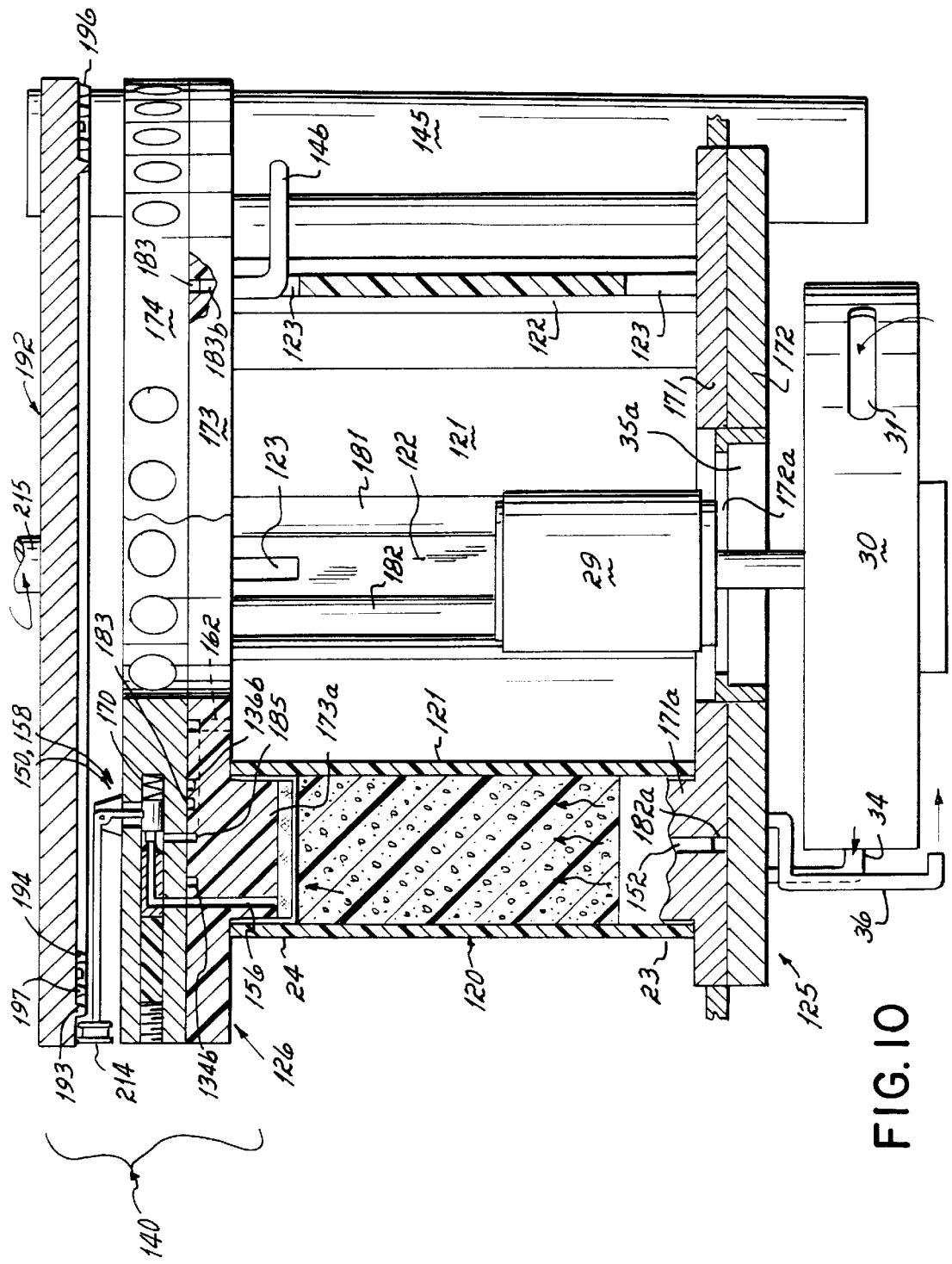
FIG. 10 is a side view, similar to FIG. 4, of the sieve bed and valve assembly of another embodiment of the oxygen concentrator of FIGS. 1–3G.
Figure 11:
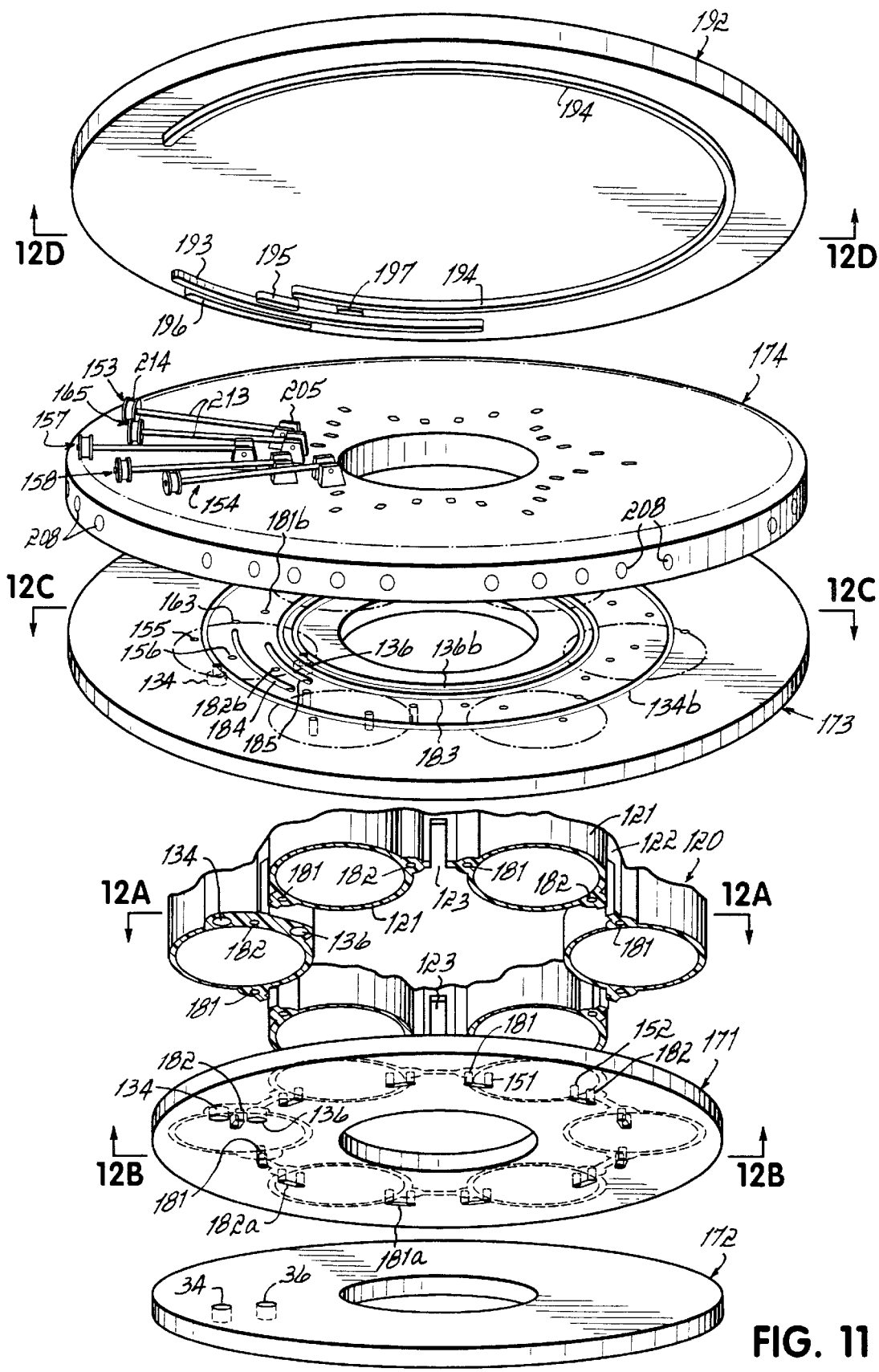
FIG. 11 is a schematic diagram, similar to FIG. 5, in the form of an exploded perspective view of the embodiment of FIG. 10 illustrating particularly the valve and port configuration.
Figure 12A:
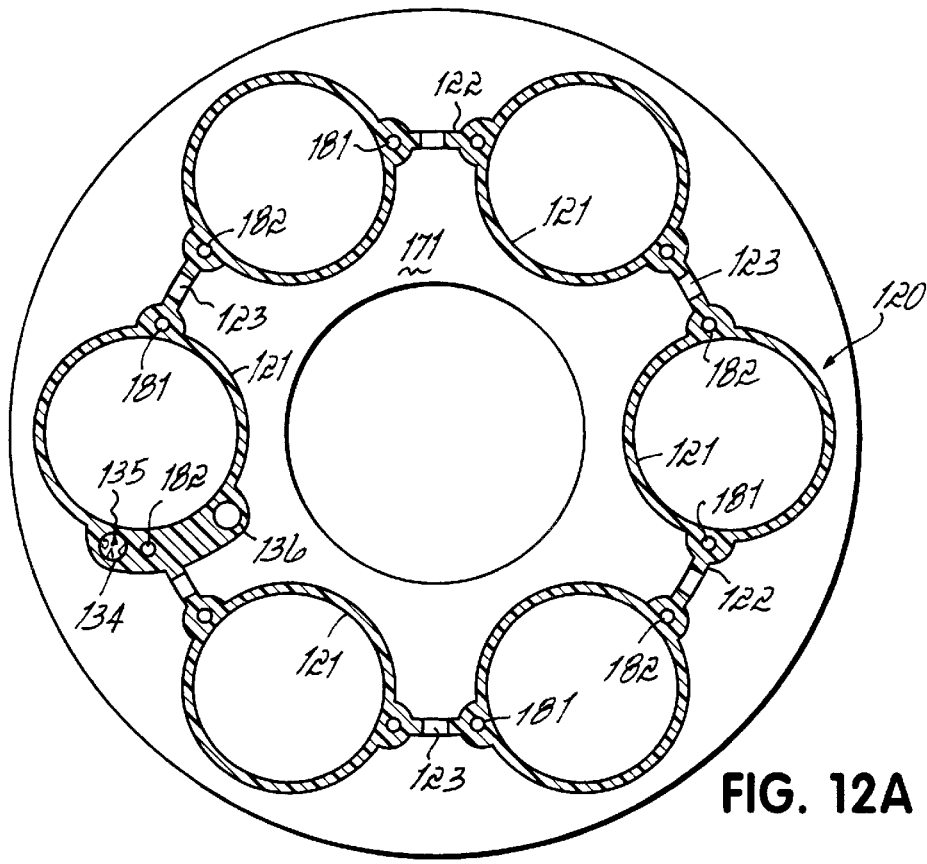
FIGS. 12A–12D are diagrammatic plan views, similar to FIGS. 6A–6D, respectively, but of the lower sieve, upper sieve and valve manifolds and of the valve face cam of the embodiment of FIG. 10, taken respectively along lines 6A—6A through 6D—6D of FIG. 11, with FIGS. 12A and 12C being top views and FIGS. 12B and 12D being bottom views.

In an alternative embodiment, the concentrator 11 is provided with mechanically actuated valves and a configuration that differs in certain other respects, as illustrated in FIG. 10. In this embodiment, the sieve beds 20 have extruded plastic canisters 121 which are formed as part of an integral extruded plastic sieve bed assembly 120, illustrated in cross section in FIG. 12B. The sieve bed assembly 120 includes six of the sieve bed canisters 121 interconnected by a web 122, in which air vents 123 are cut to permit cooling air to flow past the motor 29, which is mounted within and at the center of the assembly 120. Integrally formed in the extruded assembly 120 are a high pressure inlet extension 134 and an exhaust port extension 136 that respectively communicate with and extend the high pressure inlet 34 and exhaust port 36 at the inlet side 23 of the beds 20 at the bottom thereof to a mechanical valve assembly 140 at the outlet side 24 of the beds 20 at the top thereof. Also integrally formed in the extruded assembly 120 on opposite sides of each of the canisters 121 adjacent the web 122 are conduits 181 and 182 that connect between the valve assembly 140 at the top of the assembly 120 and the bottom or inlet side 23 of the assembly 120. Further, provision may be made to prevent water condensation from entering and damaging the material within the sieves 120. This may be accomplished by dehumidifying the inlet air. Such dehumidification can be accomplished by providing a water absorbing material such as silica gel crystals 135, either within the tube 134 through which all inlet air to the sieves 120 will be required to flow as illustrated in FIG. 12A, or preferably in the inlet ends 23 of each bed to dehumidify and then be purged by gas flowing into and out of the inlet ends 23 of each bed 20.

Figure 12B:
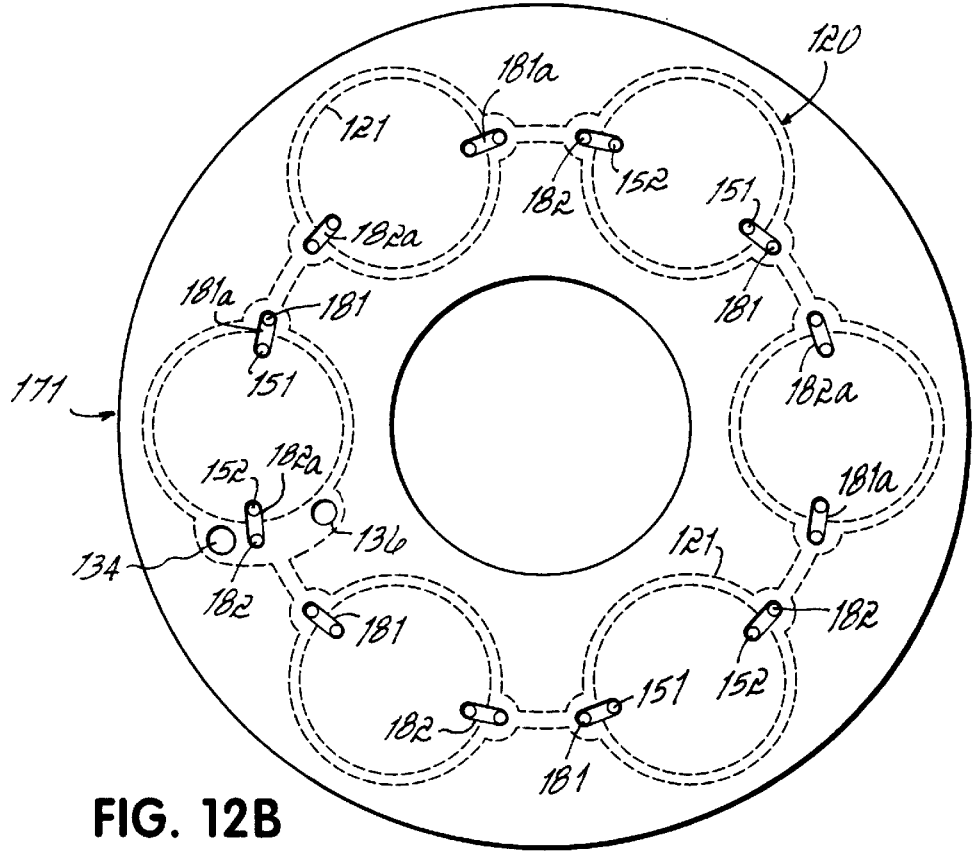

In this embodiment, lower and upper thermoplastic manifold assemblies 125 and 126 respectively replace the valve assemblies 25 and 26 of the embodiment of FIG. 4. The manifold assemblies 125 and 126, however, contain no valves. The manifold assembly 125 includes a manifold body 171, preferably of molded plastic, having six extender discs 171a formed integrally thereon which are inserted into the inlet ends 23 of the canisters 121 of the assembly 120. The manifold assembly 125 also includes a manifold cover 172, also preferably of molded plastic, that is secured to the manifold body 171 preferably by fusion welding, or by bolts (not shown). Formed on the bottom of the main manifold 171 between it and the cover 172 are sets of ports 181a and 182a respectively interconnecting the lower ends of the conduits 181 and 182 of the assembly 120 with inlet ports 151 and dump or exhaust ports 152 of the beds 20, as illustrated in FIG. 12B. The port 151 and conduits 181 and 181a are comparable to port 51 and conduit 81 in the first embodiment while port 152 and conduits 182 and 182a are comparable to port 52 and conduit 82 of the first embodiment. The main manifold 171 is sealably connected to the rim of the inlet ends of the sieve bed canisters 121, preferably by fusion welding. The fan inlet 35a is formed in the center of the manifold body 171 and the cover 172, with the motor 29 being supported on a spider 172a integrally formed in the cover 172.

Figure 12C:
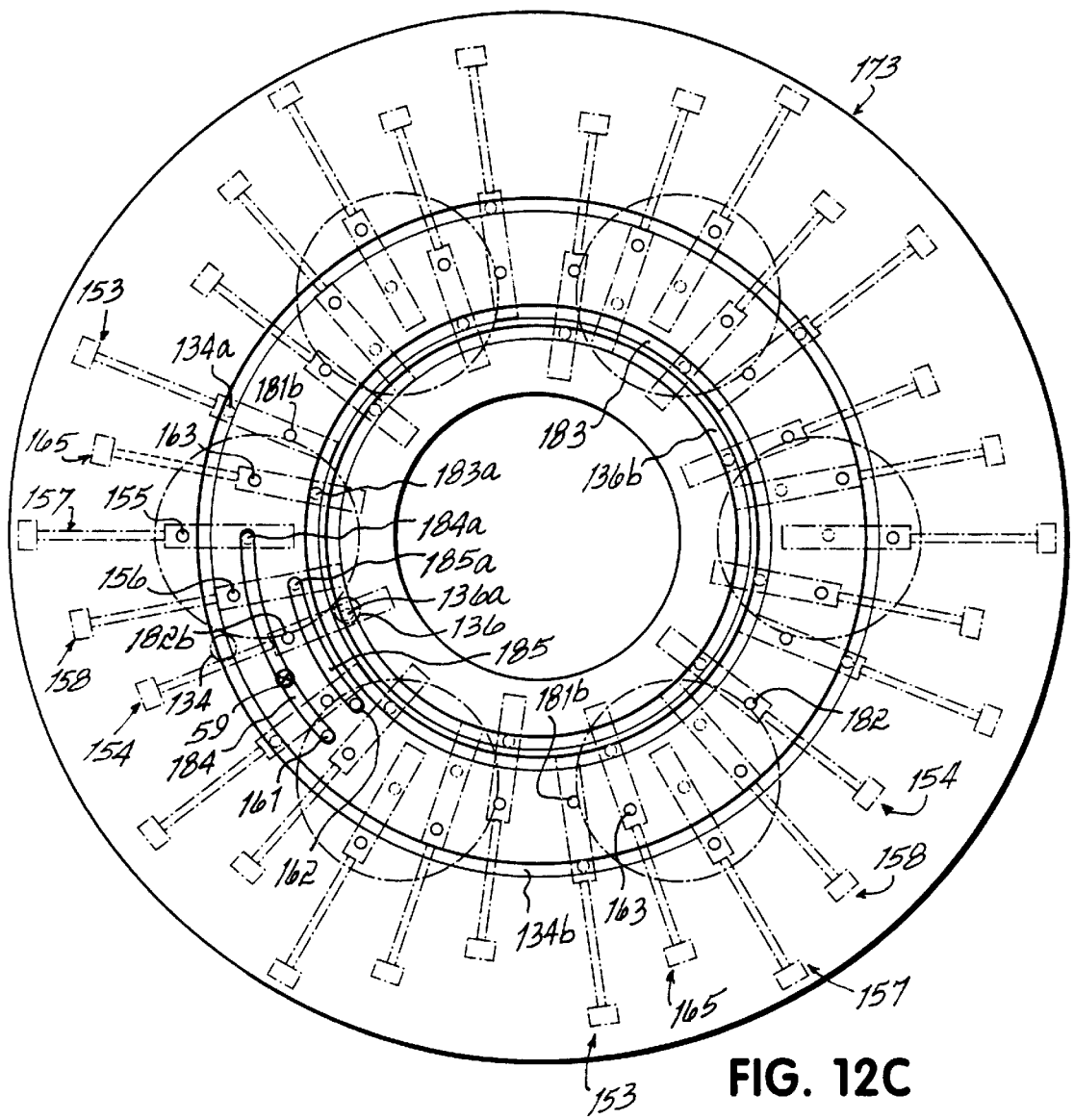

The upper or outlet end manifold assembly 126 includes a main manifold 173 on which are integrally formed extender discs 173a that are inserted into the outlet ends 24 of the canisters 121 of the assembly 120. An upper manifold cover 174 is sealably secured to the top of the main manifold 173, preferably by fusion welding, or by bolts (not shown). The cover 174 forms the body of the valve assembly 140. The manifold passages within the upper manifold assembly 126 are illustrated in FIG. 12C. The configuration of the passages in the manifold 173 for the valve assembly 140 are illustrated in phantom in FIG. 12C. The passages of the upper manifold assembly 126 include those that are comparable to the ports and passages of the manifolds 73 and 74 of the embodiment of FIGS. 5A and 5B, the flow through which is also represented by the diagram of FIG. 3, with the diaphragm valves 53, 54, 57, 58 and 65 being replaced, in the mechanical valve embodiment, by their corresponding mechanical valve counterparts 153, 154, 157, 158 and 165.

Figure 13:
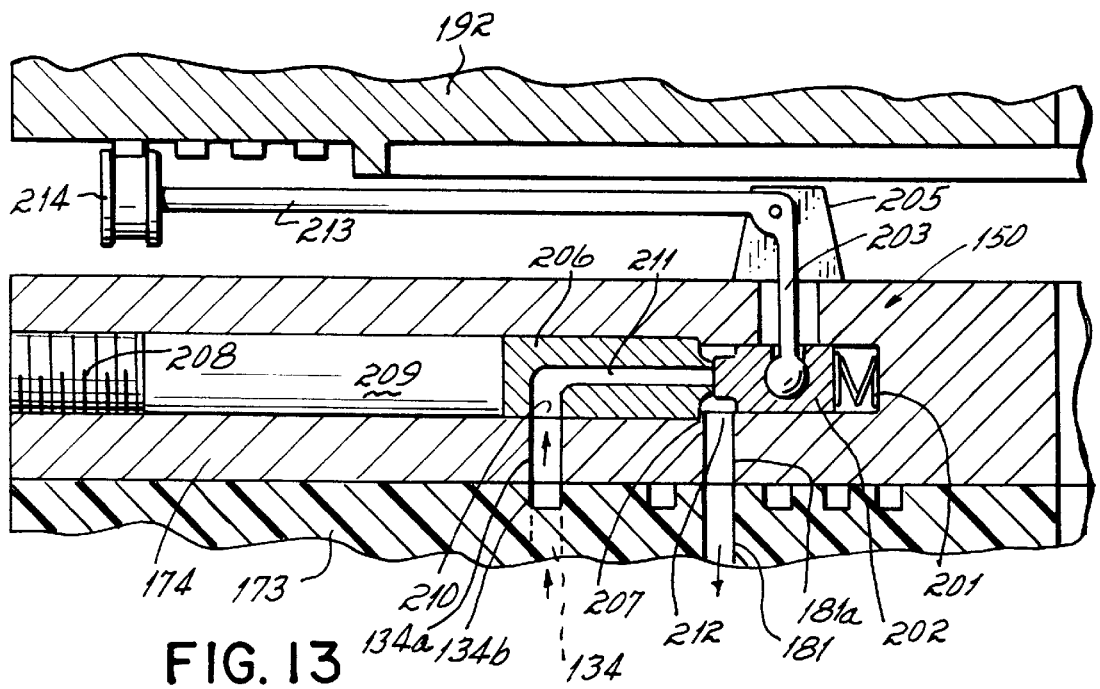
FIG. 13 is a cross-sectional view of an individual valve of the embodiment of FIG. 10 in the closed condition.
Figure 14:
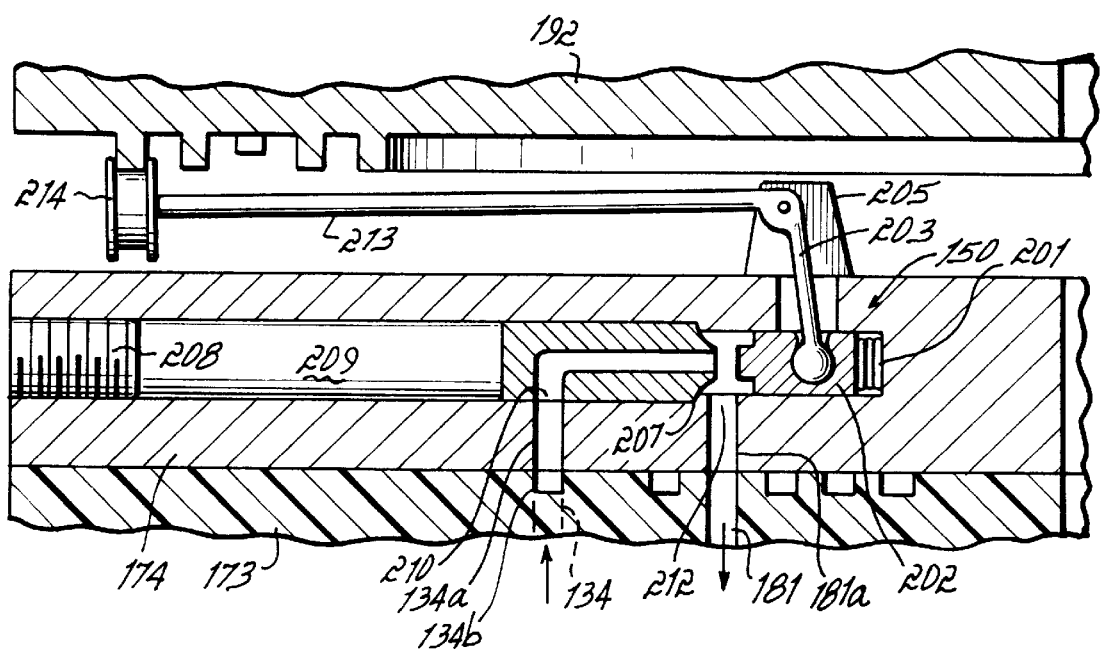
FIG. 14 is a cross-sectional view of an individual valve of the embodiment of FIG. 10 in the open condition.

The details of the individual mechanical valves 153, 154, 157, 158 and 165 are identical to each other. Each includes a mechanical valve mechanism 150 as illustrated in FIG. 13. Each mechanism 150 is each assembled in a bore 170 in the cover 174 that forms the body of the valve assembly 140. The valve mechanisms 150, thirty in number, are mounted with one in each of thirty bores 170 drilled radially into the manifold 174 of the valve assembly 140, in the pattern illustrated in FIG. 12C. Each valve mechanism 150 includes a compression spring 201 that is inserted in the bore 170. A valve poppet 202 is inserted into and slidable within the bore 170 against the force of the compression spring 201. The poppet 202 is held in place and moveable axially in the bore by an operating lever 203 of a bell crank assembly 204, which is pivotally mounted on a rigid support 205, which is fixed relative to the manifold 174. A valve seat 206 is inserted into the bore 170 and rests against a tapered shoulder 207 where the bore diameter steps down. A plug 208 is threaded into the end of the bore 170 to retain seat 206 against the shoulder 207. The seat 206 holds poppet 202 and spring 201 within the bore and positions the seat 206 in contact with the outer end of the poppet 202 when the poppet is moved outward in the bore to close the valve. The end of the poppet 202 is spaced from the seat 206 when the poppet 202 is moved into the bore 170 to open the valve. Because the different valves 153, 154, 157, 158 and 165 are each at a different radial distance from the rim of the manifold 174, the plugs 207 are either of different depths or are accompanied by spacers or stiff compression springs 209 to hold the assemblies 150 within the bores 170. Inlet gas flows into the valve through an inlet port 210 and through an axial passage 211 in the seat 206. When the valve is open, the gas flows from passage 211 past the tip of the seat 206 and out an outlet 212. The mechanism of FIG. 13 is shown as an inlet valve 153, with the inlet 210 thereof connected to port or hole 134a and the outlet 212 thereof connected to port or hole 181b. The valve 150 illustrated in section in FIG. 10 is an equalize valve 158.

A face cam 192 is rotatably mounted on a vertical shaft 215 at the center of the valve assembly 140. The cam 192 is driven by the motor 40a (FIG. 2) in the same manner that the aperture plate 92 of the control valve 40 is driven in the first embodiment described above. Five cam surfaces 193–197 are provided on the face cam 192, one for each of the valve types 153, 154, 157, 158 and 165. Each of the bell crank assemblies 204 has an arm 213 with a cam follower 214 rotatably mounted on the remote end thereof. Each of the different valves 153, 154, 157, 158 and 165 is mounted at a specific radial position, with the inlets 210 and outlets 212 lining up with the appropriate passages in the manifold 173, which are placed so that the cam followers 214 of the respective valves align radially with the cams 193–197, respectively, which are at different radii on the face cam 192.

Cam 194 operates dump valve 154, cam 193 operates inlet valve 153, cam 196 operates purge valve 157, cam 195 operates equalize valve 158 and cam 197 operates outlet valve 165. The positions of the cams 193–197 relative to a 0° reference position in the operating cycle of the concentrator is the same as the corresponding slots 93–97 of the pneumatic control valve 40, except that they are progressively offset by some circumferential amount, which is 11° in the illustrated embodiment of FIG. 12D, to allow for the planar circumferentially spaced arrangement of the valves 150 in the spaced radial bores 170 in the manifold 174. This is illustrated in Table I as follows:

TABLE I

| Valve | Open | Close | Offset | Cam down | Cam up |
|---|---|---|---|---|---|
| Dump | 81° | 0° | 0° | 81° | 0° |
| Inlet | 16° | 76° | 44° | 60° | 120° |
| Purge | 40° | 64° | 22° | 62° | 86° |
| Outlet | 53° | 59° | 33° | 86° | 92° |
| Equalize | 61° | 76° | 11° | 72° | 87° |

The timing provided by the face cam 192 is the same as that provided by the aperture plate 92 of the control valve 40 of FIG. 6, except that, because no portion of the output of the pump 29 is needed to provide control air, the inlet valves 153 are open for 60° of the cycle rather than only 51° as with the pneumatically operated diaphragm valves 53.

As illustrated in FIG. 12C, the ports of the manifold 126 include, for each sieve 20, an inlet gas passage 181b and an exhaust gas passage 182b that respectively align with conduits 181 and 182 of the extruded sieve bed assembly 120, ports 155,156 and 163, that correspond to ports 55, 56 and 63 of the first embodiment described above, that communicate with the outlet end of the sieve bed 20. The ports 182b, 155, 156 and 163 align with ports in the manifold 174 that communicate with the inlets 210 respectively of a dump valve 154, a purge valve 155, an equalize valve 156, and an outlet valve 165, while the port 181b aligns with the port of the manifold 174 that communicates with the outlet 212 of an inlet valve 153. The inlet 210 of each inlet valve 153 in manifold 174 aligns with an annular passage 134b in the manifold 173 that connects to a hole 134a, which is the pressurized inlet extension 134 of the assembly 120. The outlet 212 of each dump valve 154 in the manifold 174 aligns with an annular passage 136b in the manifold 173, which passage 136b in turn connects with a hole 136a that connects to the exhaust port extension 136 of the assembly 120. The outlet 212 of each purge valve 157 in the manifold 174 aligns with a hole 184a that connects to an arcuate passage 184 in the manifold 173, which passage 184 in turn connects through restriction valve 59 with the purge inlet port 161 on the outlet side of the adjacent sieve 20. The outlet 212 of each equalize valve 158 in the manifold 174 aligns with a hole 185a that connects to an arcuate passage 185 in the manifold 173, which passage 185 in turn connects with the equalize inlet port 162 on the outlet side of the adjacent sieve 20. The outlet 210 of each outlet valve 165 in the manifold 174 aligns with a hole 183a that connects to an annular passage 183 in the manifold 173, which passage 183 in turn connects through a passage 183b with the outline line 146 to reservoir 145 that is in the form of either the reservoir 45 of FIG. 2, or is preferably in the form of a vertically oriented cylindrical tube 145 (FIG. 10).

Figure 12D:
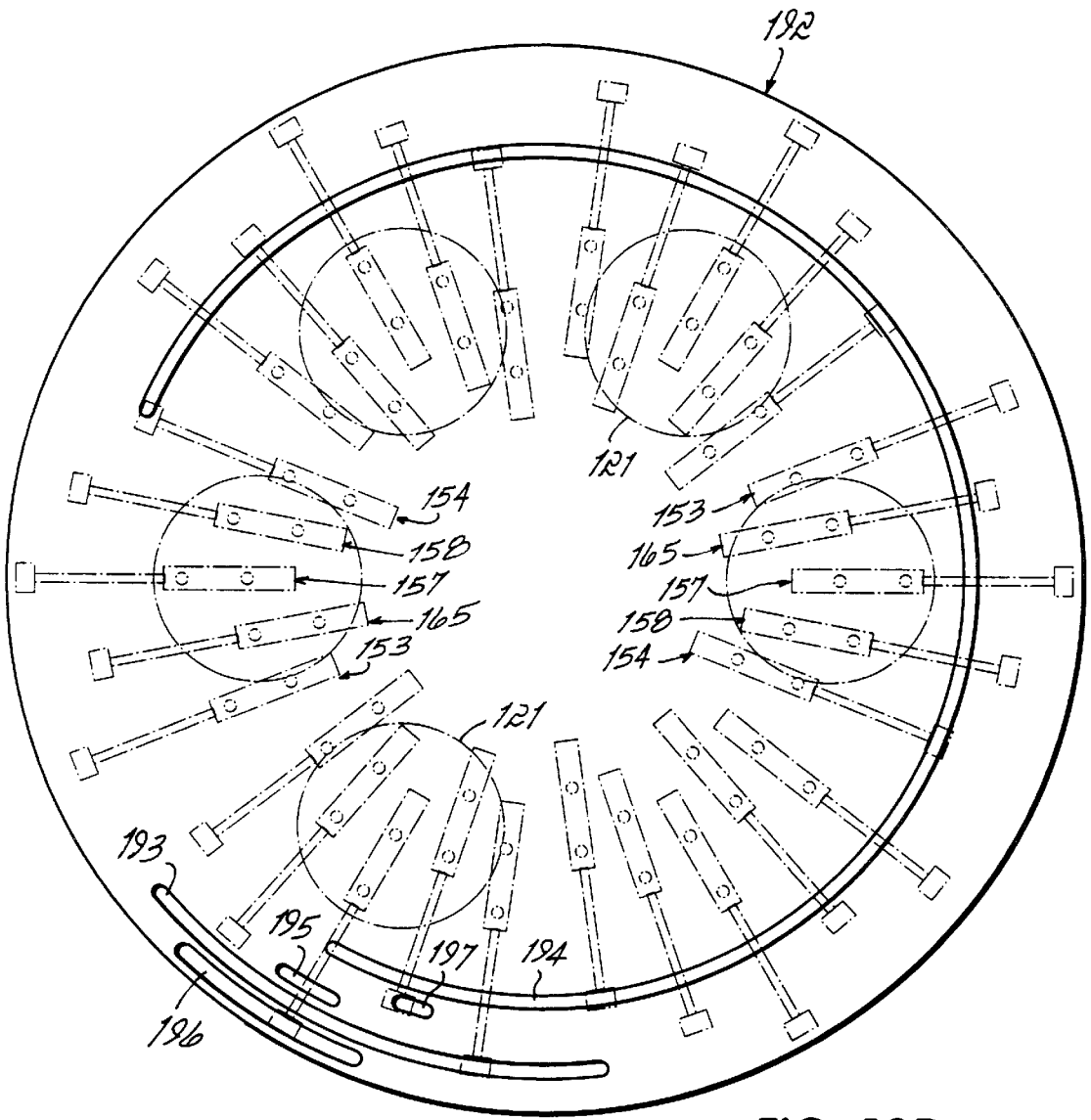
Figure 15:
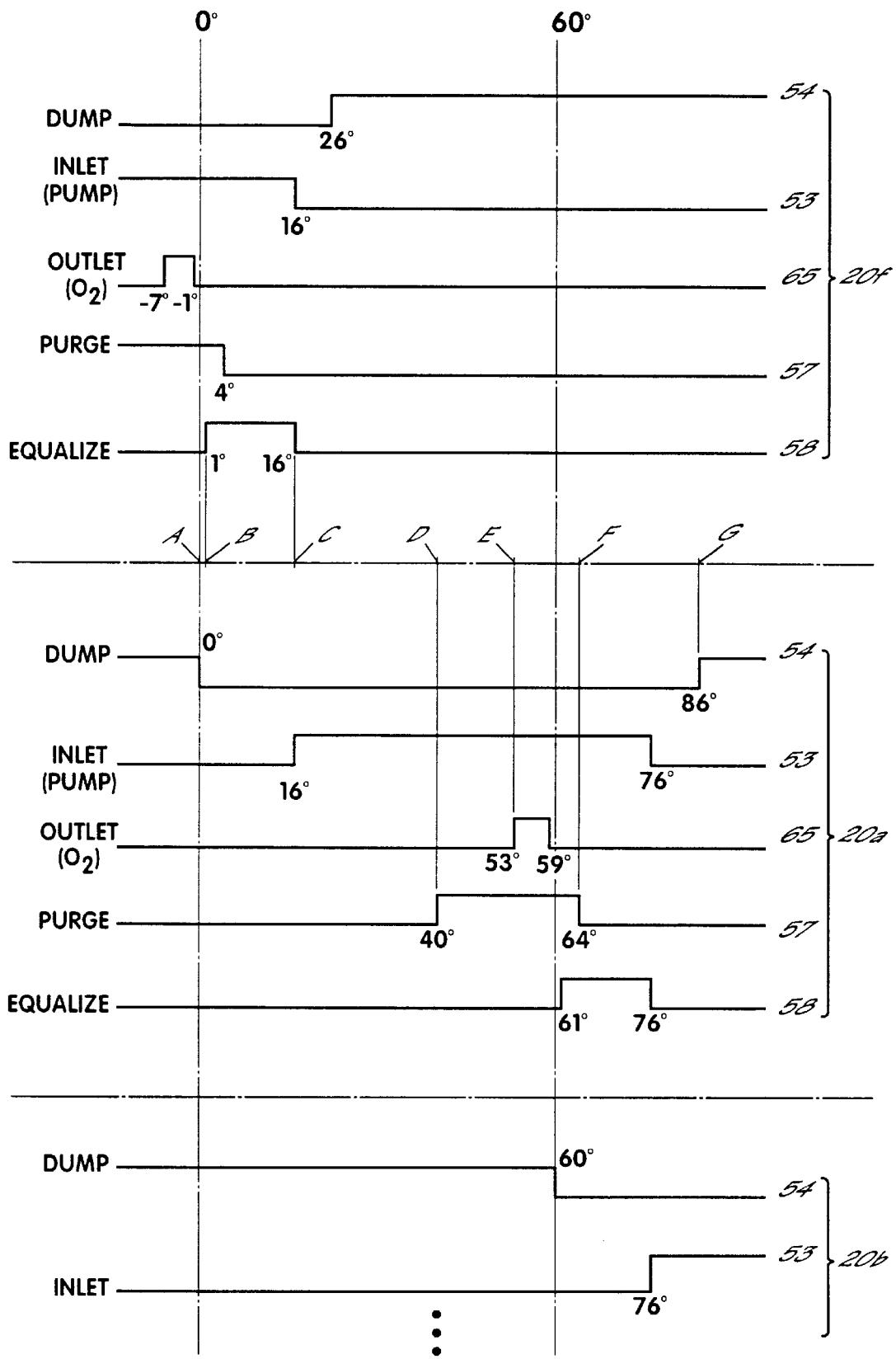
FIG. 15 is a detailed timing diagram similar to FIG. 8 illustrating in detail the preferred relative timing of the valves of a single sieve bed in the embodiment of FIG. 10.
Figure 16:
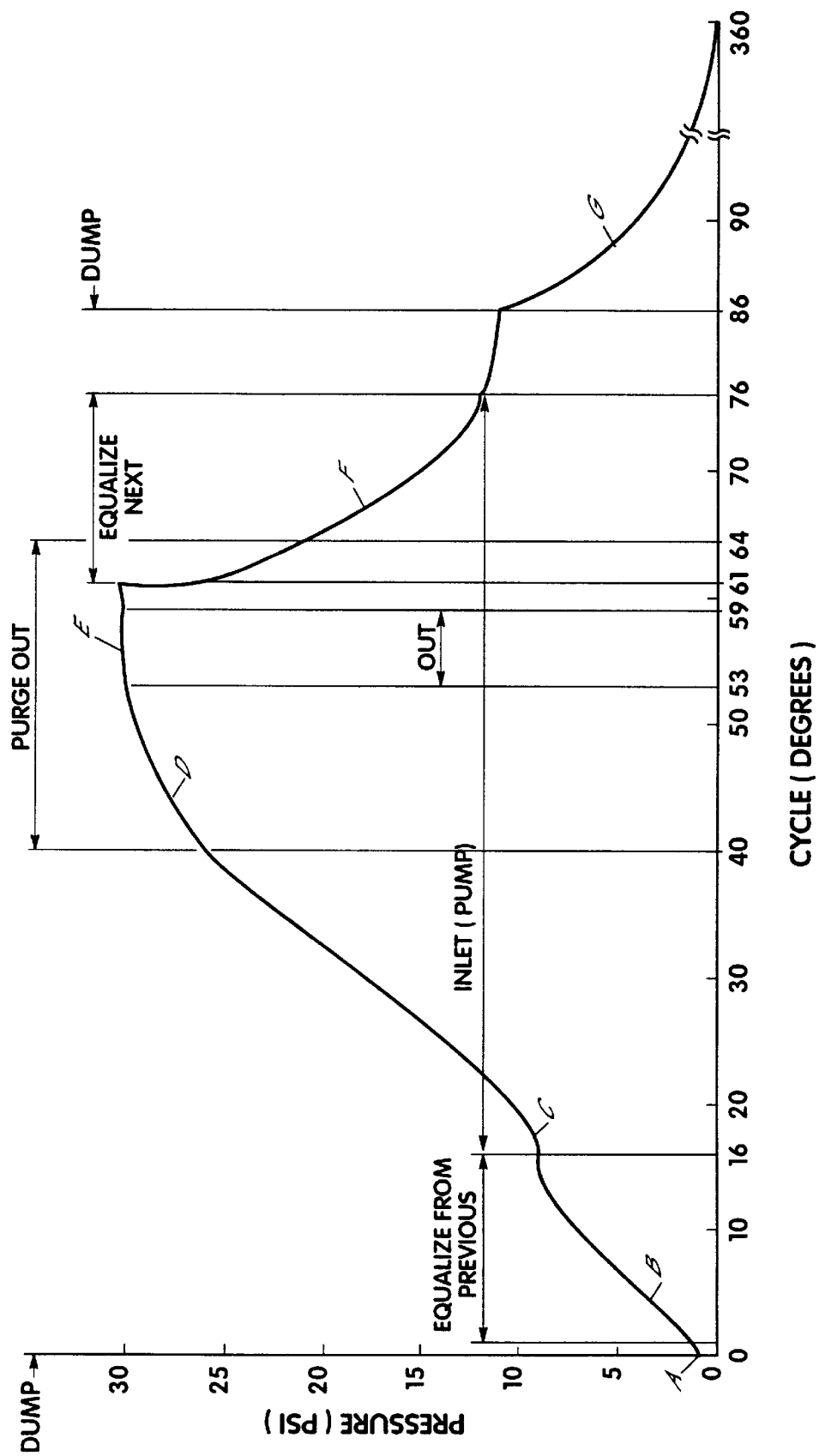
FIG. 16 is a diagram of the pressure within a bed as a function of the portion of the cycle illustrated by the timing diagram of FIG. 15.

The cycle of operation of the mechanical valve embodiment of the concentrator 11 is illustrated in FIG. 15, and may be identical to that illustrated in the timing diagrams of FIGS. 7 and 8, except that, because no portion of the pump output is needed to supply control air, the inlet cycle is preferably a full 60°. In addition, the other valves are preferably timed as set forth in Table 1 above. Subject to this same exception, the sieve pressure diagram, as set forth in FIG. 16, is also the same for the mechanical valve embodiment of the concentrator as for the pneumatic valve embodiment. The cam illustrations of FIG. 12D are the mechanical counterpart of the aperture plate diagram of FIG. 6D. The beginning of the cycle is represented as 0°, which is the position of the face cam 192. Also at the beginning of the cycle, the dump valve 154 of the first sieve 20a is open while the other valves for that sieve are closed. Other sieves are phased at 60° intervals around the machine cycle, as with the embodiment above.

Variations of pressures, sieve size, pump size, valve type and subcycle timing may be made utilizing the principles of the invention embodied in the above described versions of the concentrator 11. Those skilled in the art will appreciate that compensating variations can be made to meet various design considerations and system requirements for a variety of applications. Those skilled in the art will appreciate that the applications of the present invention are varied, that the invention is described in its preferred embodiments, and, accordingly, that these and other additions and modifications can be made without departing from the principles of the invention.

Therefore, the following is claimed:

1. A rapid pressure swing adsorption concentrator comprising:
   a plurality of at least three molecular sieves connected to operate in sequence in a cycle during which each sieve is pressurized to a pressure higher than atmospheric pressure, each sieve having an inlet side and an outlet side;
   valve means for operating each of the sieves sequentially through the cycle such that each sieve has a venting subcycle during which the sieve is vented substantially to atmospheric pressure from the inlet side thereof and remaining portion of the cycle during which the sieve is pressurized from its inlet side and exchanges product rich gas at its outlet side, with each sieve substantially being in the remaining portion of its cycle when a majority of the other sieves are simultaneously in their respective venting subcycles.

2. The concentrator of claim 1 wherein:
   the valve means is operative to cycle each of the sieves sequentially through the cycle such that each sieve has a pressurization subcycle, included in said remaining portion of the cycle, of approximately one to two seconds and a depressurization subcycle, which includes the venting subcycle, of approximately five to ten seconds.

3. The concentrator of claim 1 wherein:
   the valve means is operative to cycle each of the sieves sequentially through the cycle such that each sieve has a pressurization subcycle, included in said remaining portion of the cycle, of approximately one to two seconds and a depressurization subcycle, which includes the venting subcycle, of approximately five times as long as the pressurization subcycle.

4. The concentrator of claim 1 wherein:
   the valve means is operative to cycle each of the sieves sequentially through the cycle such that each sieve has a pressurization subcycle, included in said remaining portion of the cycle, of less than approximately two seconds and a depressurization subcycle, which includes the venting subcycle, of more than approximately five seconds.

5. The oxygen concentrator of claim 4 wherein the at least one valve assembly further comprises:
   at least one outlet side valve assembly having a product outlet port, at least one sieve outlet port connected to the outlet sides of each of the sieves, and outlet side ducts selectively interconnecting the ports of the outlet side valve such that the outlet side of each of the sieves is, between two input depressurization subcycles thereof, connected to the product outlet for an output subcycle of the sieve, and to the outlet side of other of the plurality of the sieves for a reverse flow subcycle thereof.

6. The concentrator of claim 1 wherein:
   the plurality of molecular sieves includes N molecular sieves, where N equals at least 3, connected to operate in sequence in the cycle, with each sieve having a pressurization subcycle, included in said remaining portion of the cycle, that is not more than approximately 360/N° in duration and a depressurization subcycle, which includes the venting subcycle, that is not more than and not substantially less than approximately 360×(N−1)/N° in duration.

7. The concentrator of claim 1 wherein:
   the plurality of molecular sieves includes 6 molecular sieves connected to operate in sequence in a cycle, with each sieve having a pressurization subcycle, which is included in said remaining portion of the cycle, that is not more than approximately 60° in duration and a depressurization subcycle, which includes the venting subcycle, that is not between 270° and 300° in duration.

8. The concentrator of claim 1 further comprising:
   valving and interconnecting ductwork between the sieves and a common output having a volume that is approximately 2%, and not more than approximately 5% of the output per cycle of the sieves.

9. The concentrator of claim 1 wherein:
   the venting subcycle is at least approximately four and one-half seconds.

10. The concentrator of claim 1 wherein:
    the plurality of molecular sieves includes N molecular sieves, where N is greater than or equal to 3, connected to operate in sequence in the cycle, with each sieve having a pressurization subcycle, which is included in said remaining portion of the cycle, that is not more than approximately 360/N° in duration, the venting subcycle being not more than approximately 360×(N−1)/N° in duration and not substantially less than approximately (N+1)/2N° in duration.

11. An oxygen concentrator comprising:
    a plurality of more than two molecular sieves each sieve having an inlet side and an outlet side;
    a pump having an ambient air intake connected to atmosphere and a high pressure outlet;
    at least one valve assembly having an inlet port connected to the high pressure outlet of the pump, a low pressure outlet port, at least one sieve port connected to the inlet sides of each of the sieves, and inlet side ducts selectively interconnecting the ports such that the inlet side of each of the sieves is connected to the high pressure outlet of the pump during an inlet pressurization subcycle thereof and to the low pressure outlet during an inlet depressurization subcycle thereof; and
    a valve control connected to the valve assembly and configured to operate the valve assembly in a cycle that includes alternating the inlet pressurization and depressurization subcycles for each sieve, with each inlet pressurization subcycle being not more than half the duration of the inlet depressurization subcycle of the sieve, with the inlet pressurization subcycles of at least two other sieves of the plurality totally occurring during the inlet depressurization cycle of each sieve.

12. The oxygen concentrator of claim 11 wherein:
    the inlet pressurization subcycle is not more than one third the duration of the inlet depressurization subcycle of each sieve.

13. The oxygen concentrator of claim 11 wherein:
    the inlet pressurization subcycle is not more than one fourth the duration of the inlet depressurization subcycle of each sieve.

14. The oxygen concentrator of claim 11 wherein:
the pressurization inlet subcycle is not more than one fifth the duration of the inlet depressurization subcycle of each sieve.

15. The oxygen concentrator of claim 11 wherein: the inlet pressurization subcycles of all other sieves of the plurality substantially totally occur during the inlet depressurization cycle of each sieve.

16. The oxygen concentrator of claim 11 wherein:
the inlet pressurization subcycle of each sieve is between one sixth and one tenth the duration of the cycle.

17. The oxygen concentrator of claim 11, wherein:
the plurality of sieves includes N sieves, where N is an interger greater than 2; and
the inlet pressurization subcycle is not more than 1/Nth the duration of the inlet depressurization subcycle of each sieve.

18. The oxygen concentrator of claim 11 wherein the at least one valve assembly further comprises:
at least one outlet side valve assembly having a product outlet port, at least one sieve outlet port connected to the outlet sides of each of the sieves, and outlet side ducts selectively interconnecting the ports of the outlet side valve such that the outlet side of each of the sieves is, between two input depressurization subcycles thereof, connected to the product outlet for an output subcycle of the sieve, and to the outlet side of an other of the plurality of the sieves for a subcycle thereof.

19. A rapid pressure swing adsorption oxygen concentrator for producing oxygen of at least ninety percent purity at a rate of in the approximate range of two to five liters per minute, the apparatus comprising:
an air compressor having a compressor outlet;
a product outlet;
a plurality of molecular sieves having a total volume of less than approximately one liter, each sieve having an inlet side and an outlet side;
outlet-side valves connected to the outlet sides of each of the sieves and the product outlet;
inlet-side valves connected to the inlet sides of each of the sieves, the air compressor outlet and atmosphere;
a valve cycle control connected to the inlet-side valves and to the outlet-side valves to operate each of the sieves in a cycle of not longer than approximately twelve seconds with the sieves phased relative to each other at approximately equal intervals around the cycle; and the valve cycle control being programmed to operate each one of the sieves through a sequence of subcycles, including:

(a) a venting subcycle of at least four and one-half seconds duration during which the sieve is vented from its inlet side through one of the inlet-side valves and substantially to atmosphere, (b) an inlet subcycle during which the sieve is pressurized with air from the compressor outlet through one of the inlet-side valves into the inlet side of said one of the sieves (c) an outlet subcycle during which oxygen rich gas is output from the outlet side of said one of the sieves through one of the outlet-side valves to the product outlet, (d) a pair of equalization subcycles during which (1) oxygen rich gas is output from the outlet side thereof through one of the outlet-side valves and into the outlet side of one of the other sieves without venting the other sieve from its inlet side to atmosphere, and (2) oxygen rich gas is input to the outlet side of said one of the sieves through one of the outlet-side valves from the outlet side of another one of the sieves without venting said one of the sieves from its inlet side to atmosphere, and (e) a pair of purge subcycles during which (1) oxygen rich gas output from the outlet side thereof through one of the outlet-side valves and into the outlet side of one of the other sieves while gas is venting from its inlet side of such other sieve to atmosphere, and (2) oxygen rich gas is input to the outlet side thereof through one of the outlet valves from the outlet side of another one of the sieves while gas is venting from the inlet side of said one of the sieves through one of the inlet-side valves to atmosphere and;

the inlet subcycle (b), the outlet subcycle (c), the equalization subcycles (d)(1) and (d)(2) and the purge subcycle (e)(1) for each one of the sieves collectively occupying a portion of the cycle that is shorter in duration than the venting subcycle (a).

* * * * *

UNITED STATES PATENT AND TRADEMARK OFFICE
CERTIFICATE OF CORRECTION

PATENT NO. : 5,827,358
DATED : Oct. 27, 1998
INVENTOR(S) : Stanley Kulish and Robert P. Swank It is certified that error appears in the above-identified patent and that said Letters Patent is hereby corrected as shown below:

In column 7, line 56, after "hereafter", delete "to".

In column 9, line 47, after "channel", delete "99" and insert therefore --99a--.

In the claims

In claim 5, column 15, line 65, delete "other" and insert therefor --another--.

In claim 19, column 18, line 31, after "gas", insert --is--.

Signed and Sealed this

Twenty-ninth Day of June, 1999

Attest:

Q. TODD DICKINSON

*Attesting Officer*          *Acting Commissioner of Patents and Trademarks*